(12) United States Patent
Poton et al.

(10) Patent No.: US 11,117,552 B2
(45) Date of Patent: Sep. 14, 2021

(54) ADAPTER FOR A MOTOR VEHICLE WINDSCREEN WIPER AND WIPER COMPRISING SUCH AN ADAPTER

(71) Applicant: Valeo Systèmes d'Essuyage, Le Mesnil Saint Denis (FR)

(72) Inventors: Eric Poton, Issoire (FR); Vincent Gaucher, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 435 days.

(21) Appl. No.: 16/157,674

(22) Filed: Oct. 11, 2018

(65) Prior Publication Data

US 2019/0118779 A1 Apr. 25, 2019

(30) Foreign Application Priority Data

Oct. 20, 2017 (FR) ...................................... 1759925

(51) Int. Cl.
*B60S 1/40* (2006.01)

(52) U.S. Cl.
CPC ..... *B60S 1/4048* (2013.01); *B60S 2001/4051* (2013.01); *B60S 2001/4054* (2013.01); *B60S 2001/4058* (2013.01)

(58) Field of Classification Search
CPC .................. B60S 1/4038; B60S 1/4048; B60S 2001/4051; B60S 2001/4054; B60S 2001/4058; B60S 1/4045
USPC ...................................................... 15/250.32
See application file for complete search history.

(56) References Cited

U.S. PATENT DOCUMENTS

| | | | | |
|---|---|---|---|---|
| 7,716,780 B2* | 5/2010 | Scholl | ................... | B60S 1/3849 |
| | | | | 15/250.32 |
| 8,286,298 B2* | 10/2012 | Kim | ...................... | B60S 1/4003 |
| | | | | 15/250.32 |
| 2017/0015281 A1* | 1/2017 | Mouleyre | ............... | B60S 1/381 |
| 2018/0105144 A1* | 4/2018 | Yee | ........................... | B60S 1/38 |

FOREIGN PATENT DOCUMENTS

| | | | |
|---|---|---|---|
| DE | 102014226523 | * | 6/2016 |
| EP | 2505440 A2 | | 10/2012 |
| FR | 3037896 A1 | | 12/2016 |
| FR | 3037905 A1 | | 12/2016 |
| WO | 2005039944 | * | 5/2005 |
| WO | 2006 106006 A1 | | 10/2006 |

OTHER PUBLICATIONS

Machine translation of description portion of German publication 1020146523, published Jun. 2016. (Year: 2016).*
Preliminary Search Report and Written Opinion issued in corresponding French Application No. 1759925, dated Jul. 9, 2018 (8 pages).

* cited by examiner

*Primary Examiner* — Gary K. Graham
(74) *Attorney, Agent, or Firm* — Osha Bergman Watanabe & Burton LLP

(57) ABSTRACT

The invention proposes an adapter (26) for a wiper (10) comprising a body (25) of elongate shape which is shaped to be mounted in a complementary yoke (28) of inverted U-shaped cross section belonging to a wiper arm, characterized in that the body (1025) of the adapter (1026) comprises at least one elastic tab (1132*a*, 1132*b*) which is deformable in the transverse direction so as to retract as the adapter (1026) is being assembled and/or dismantled with respect to the yoke (28), the elastic tab (1132*a*, 1132*b*) being borne by a lateral wall (1026*a*, 1026*b*) of the body (1025) of the adapter.

14 Claims, 12 Drawing Sheets

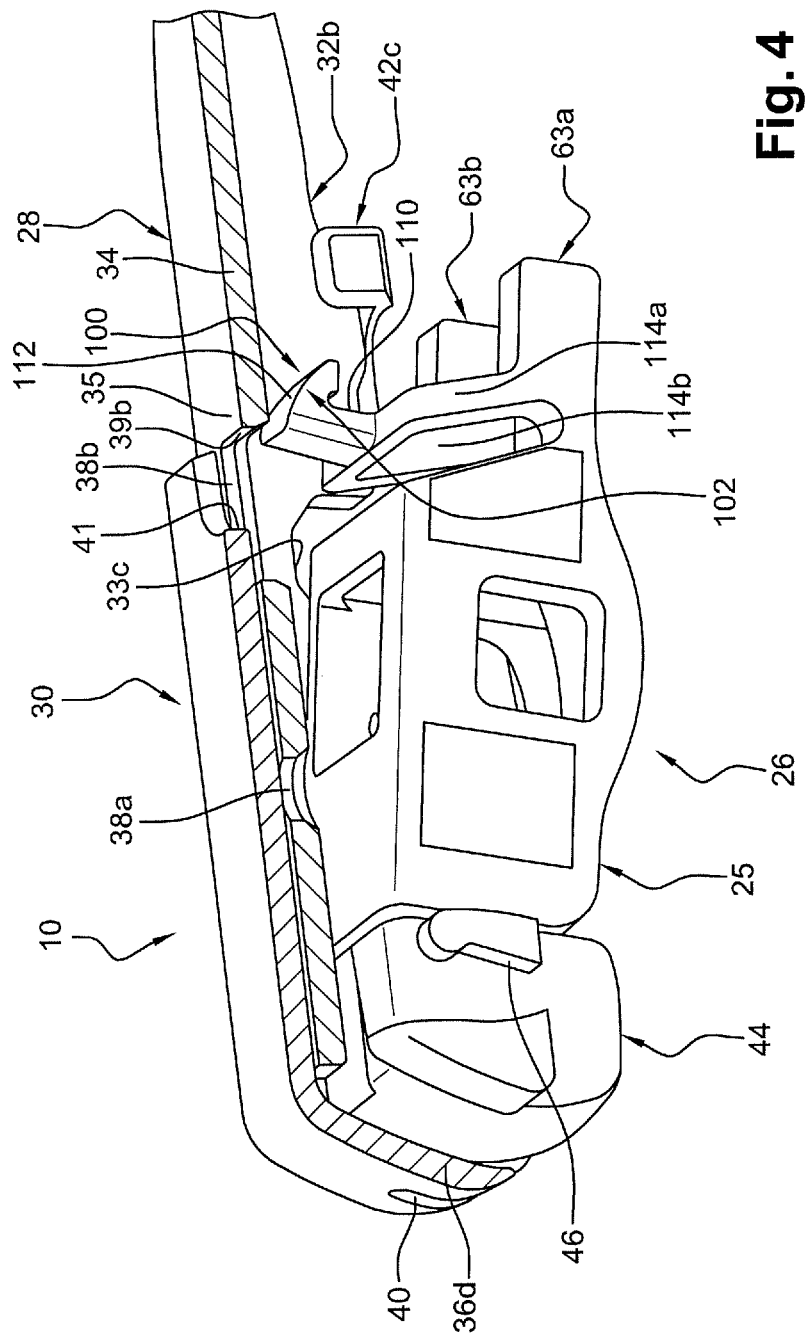

ADAPTER FOR A MOTOR VEHICLE WINDSCREEN WIPER AND WIPER COMPRISING SUCH AN ADAPTER

TECHNICAL FIELD OF THE INVENTION

The invention relates in particular to an adapter for a wiper, particularly for a motor vehicle.

The invention also relates to an assembly comprising a wiper arm and an adapter according to the invention.

The invention also relates to a motor vehicle wiper comprising a wiper blade and a connection assembly comprising an adapter according to the invention.

TECHNICAL BACKGROUND OF THE INVENTION

A motor vehicle is conventionally equipped with wipers, notably to clean the exterior surface of the windscreen and thus prevent the view that the driver has of his surroundings from being disturbed.

A wiper generally comprises a drive arm, performing a back-and-forth, notably angular, movement, and a longitudinally elongate wiper which bears a wiper blade or blade rubber made from an elastic material such as rubber or an elastomeric material.

The wiper blade rubs against the exterior surface of the windscreen and removes the water, carrying it out of the field of view of the driver.

In a conventional version, the wiper is produced in the form of articulated whiffle-tree sections which hold the wiper blade at several longitudinally distributed discrete points, applying to it a curvature that allows it to conform to the curvature or curve that the windscreen might have.

In a more recent version referred to as a "flat blade" design, the wiper is produced in the form of a semirigid assembly which supports the wiper blade along its entire length using one or more backing strips which curve the wiper blade and allow the wiper and blade to be pressed against the windscreen without the need to use whiffle-tree sections.

In both designs, the wiper is connected to the driver arm by a connection system comprising a connector and an adapter that complement one another.

The connector is a component which is secured to the wiper and which is generally fixed directly to the wiper blade or flat blade, whereas the adapter is secured to the connector.

The adapter is an intermediate component that allows the connector to be connected and fixed to the drive arm. It is generally shaped so that it can be engaged in a yoke-shaped end piece or head of inverted U-shaped cross section of the drive arm.

Each of these two components (connector and adapter) comprises articulation means which are designed to collaborate with complementary means belonging to the other component in order to define at least one transverse axis of articulation of the two components relative to one another, this also being the axis of articulation of the wiper with respect to the drive arm.

According to a known technique, one of the components, such as the connector, generally comprises a substantially cylindrical physical axis which defines the axis of articulation and which is received in a housing of complementary shape belonging to the other component.

The adapter generally comprises an elongate body which is shaped to be engaged in the front free terminal end piece of the drive arm so that this body extends at least in part between two substantially parallel lateral walls of this end piece.

An adapter allows a wiper to be fitted to a particular type of end piece. In the case of the aforementioned end pieces with inverted U-shaped cross section, there are a number of different varieties.

One known wiper arm is one in which the end piece bears a cap mounted with the ability to slide in longitudinal translation. The cap is mounted with the ability to slide longitudinally between a front first position or forward position, and a rear second position or back position. Aside from the aesthetic benefit it affords, this type of cap may perform other functions.

Various examples of designs of an adapter and of an associated assembly are illustrated in document FR-A1-3 037 896.

FIG. 12 of that document illustrates a design in which the adapter comprises a body of longitudinally elongate shape which is delimited by two vertical longitudinal lateral walls which are transversely opposite and joined together by a horizontal upper wall, and which is shaped to be mounted in a complementary yoke of inverted U-shaped cross section belonging to a wiper arm and in which, at its front longitudinal end, the body of the adapter comprises at least one retention tab which extends longitudinally forwards and which is shaped to collaborate with the yoke or a member or component borne by the yoke, so as to retain the adapter with respect to the yoke.

The invention proposes an improved adapter of this type, which is simple, effective and economical.

According to a first aspect, the invention proposes an adapter for a wiper, notably for a motor vehicle, comprising a body of longitudinally elongate shape which is delimited by two vertical longitudinal lateral walls which are transversely opposite and joined together by a horizontal upper wall, and which is shaped to be mounted in a complementary yoke of inverted U-shaped cross section belonging to a wiper arm, characterized in that the body of the adapter comprises a locking tab:
  which extends vertically projecting above the upper face of the body;
  which is configured to be received through a hole in the yoke;
  which bears a rear contact surface for contact with an edge of the hole in the yoke;
  and which is connected to the body of the adapter by a vertical connecting part which is able to deform elastically so as to allow a longitudinal movement of the rear contact surface.

According to other features of the invention:
  at its front longitudinal end, the body of the adapter comprises at least one retention tab which extends longitudinally forwards and which is shaped to collaborate with the yoke or a component borne by the yoke, so as to retain the adapter with respect to the yoke;
  the adapter comprises means for articulating the adapter in pivoting with respect to a complementary member for connection to a wiper arm, about a transverse axis of articulation;
  the at least one retention tab and the locking tab are arranged longitudinally one on each side of the axis of articulation of the adapter on the complementary connection member;

the vertical connecting part extends below the upper face of the body of the adapter;

the vertical connecting part is able to deform elastically so as to pivot with respect to the body of the adapter about a transverse axis adjacent to the lower end of the vertical connecting part;

the transverse axis is positioned vertically below the horizontal upper wall of the body of the adapter;

at its front longitudinal end, the body of the adapter comprises at least two retention tabs each of which extends longitudinally forwards in the continuation of an associated lateral wall of the body of the adapter and is shaped to collaborate with the yoke or a component borne by the yoke;

the component borne by the yoke is a front longitudinal end piece which is mounted at a front free end of the yoke of the drive arm;

the free upper part of the locking tab is shaped as a hook comprising a vertical branch which bears the rear contact surface and which is extended by a locking branch which extends longitudinally rearwards and which is delimited by a lower face shaped to collaborate with an opposing portion of the yoke;

the lower face of the locking branch is a planar face;

the locking branch of the hook is able to deform elastically so as to pivot with respect to the vertical branch, about a transverse axis adjacent to the vertical branch;

the locking branch of the hook comprises a profiled surface portion forming a cam which is able to collaborate with the edge of the hole in the yoke so as to cause the vertical connecting part to deform so as to cause the hook to move longitudinally with respect to the body of the adapter;

the hook comprises a recess formed in the region of connection between the vertical branch and the locking branch;

the hook comprises a recess formed in the continuation of the lower face of the locking branch;

the recess is a transversely oriented groove;

the lower face of the locking branch is connected to the recess by a transverse edge corner which is able to collaborate with the opposing portion of the yoke;

the adapter comprises at least one tab for longitudinal retention of the body of the adapter with respect to the yoke or a component borne by the yoke, which extends longitudinally rearwards and which is shaped to collaborate with the yoke or a component borne by the yoke.

According to a second aspect, the invention proposes an adapter for a wiper, notably for a motor vehicle, comprising a body of longitudinally elongate shape which is delimited by two vertical longitudinal lateral walls which are transversely opposite and joined together by a horizontal upper wall, and which is shaped to be mounted in a complementary yoke of inverted U-shaped cross section belonging to a wiper arm, characterized in that the body of the adapter comprises a locking tab which extends vertically projecting above an upper face of the body; which is configured to be received through a hole in the yoke; and of which the free upper part is shaped into a hook comprising a vertical branch extended by a locking branch which extends longitudinally and which is delimited by a lower face shaped to collaborate with an opposing portion of the yoke, and in which the locking branch of the hook is able to deform elastically with respect to the vertical branch.

According to other features of the invention:

the locking branch is able to deform elastically so as to pivot with respect to the vertical branch, about a transverse axis adjacent to the vertical branch;

the hook comprises a recess formed in the region of connection between its vertical branch and its locking branch;

the recess is formed in the continuation of the lower face of the locking branch;

the recess is a transversely oriented groove;

the lower face of the locking branch is connected to the groove by a transverse edge corner which is able to collaborate with the opposing portion of the yoke;

the lower face of the locking branch is a planar face.

According to a third aspect of the invention, the invention proposes an adapter for a wiper, notably for a motor vehicle, comprising a body of longitudinally elongate shape which is delimited by two vertical longitudinal lateral walls which are transversely opposite and joined together by a horizontal upper wall, and which is shaped to be mounted in a complementary yoke of inverted U-shaped cross section belonging to a wiper arm, and in which, at its front longitudinal end, the body of the adapter comprises at least one retention tab which extends longitudinally forwards and which is shaped to collaborate with the yoke or a component borne by the yoke, so as to retain the adapter with respect to the yoke, characterized in that, at its front longitudinal end, the body of the adapter comprises at least one convex curved stop surface for longitudinally positioning the adapter with respect to the yoke or a component borne by the yoke.

According to other features of the invention:

the convex stop surface extends vertically;

the convex stop surface has an upper transverse edge which is longitudinally offset forwards with respect to a lower transverse edge of the convex stop surface;

the convex stop surface is able to come to bear longitudinally against an opposing portion of the yoke or of a component borne by the yoke so as to guide the assembly of the adapter in the yoke or in a component borne by the yoke;

the convex stop surface is formed at a front longitudinal end of a longitudinal lateral wall of the body of the adapter;

the at least one retention tab comprises a lower chamfer for the insertion of the adapter in a complementary part of the yoke or of a component borne by the yoke;

the adapter comprises at least one tab for longitudinal retention of the body of the adapter with respect to the yoke or a component borne by the yoke, which extends longitudinally rearwards and which is shaped to collaborate with the yoke or a component borne by the yoke;

the adapter comprises at least one front stud which extends transversely projecting outwards and which is arranged on a front part of a lateral wall of the body, the front stud being configured to collaborate with a component borne by the yoke so as to guarantee that this component is in a determined longitudinal position with respect to the yoke;

the adapter comprises at least one rear stud which extends transversely projecting outwards and which is arranged on a rear part of a lateral wall of the body, the rear stud being configured to collaborate with the yoke so as to provide longitudinal retention of the adapter in the forward direction with respect to the yoke;

the body of the adapter comprises a locking tab which extends vertically projecting above the upper face of the body; which is configured to be received through a hole in the yoke; which bears a rear contact surface for contact with a transverse edge of the hole in the yoke; and which is connected to the body of the adapter by a vertical connecting part which is able to deform elastically so as to allow a longitudinal movement of the rear contact surface.

According to a fourth aspect of the invention, the invention proposes an adapter for a wiper, notably for a motor vehicle, comprising a body of longitudinally elongate shape which is delimited by two vertical longitudinal lateral walls which are transversely opposite and joined together by a horizontal upper wall, and which is shaped to be mounted in a complementary yoke of inverted U-shaped cross section belonging to a wiper arm, characterized in that the body of the adapter comprises at least one elastic tab which is deformable in the transverse direction so as to retract as the adapter is being assembled and/or dismantled with respect to the yoke, the elastic tab being borne by a lateral wall of the body of the adapter.

According to other features of the invention:

the elastic tab bears a longitudinal retention lug configured to collaborate with the yoke and/or a component borne by the yoke;

the retention lug has a retractable cam profile able to collaborate with the yoke and/or a component borne by the yoke;

the cam profile is a profile having two opposite slopes for mounting and dismantling respectively;

the elastic tab extends longitudinally, and the lug is formed at a front free end of the elastic tab;

at its front longitudinal end, the body of the adapter comprises at least one convex curved stop surface for longitudinally positioning the adapter with respect to the yoke or a component borne by the yoke;

the convex stop surface extends vertically;

the convex stop surface has an upper transverse edge which is longitudinally offset forwards with respect to a lower transverse edge of the convex stop surface;

the convex stop surface is able to come to bear longitudinally against an opposing portion of the yoke or of a component borne by the yoke so as to guide the assembly of the adapter in the yoke or in a component borne by the yoke;

the convex stop surface is formed at a front longitudinal end of a longitudinal lateral wall of the body of the adapter;

the adapter comprises at least one tab for longitudinal retention of the body of the adapter with respect to the yoke or a component borne by the yoke, which extends longitudinally rearwards and which is shaped to collaborate with the yoke or a component borne by the yoke;

the adapter comprises at least one front stud which extends transversely projecting outwards and which is arranged on a front part of a lateral wall of the body, the front stud being configured to collaborate with a component borne by the yoke so as to guarantee that this component is in a determined longitudinal position with respect to the yoke;

the adapter comprises at least one rear stud which extends transversely projecting outwards and which is arranged on a rear part of a lateral wall of the body, the rear stud being configured to collaborate with the yoke so as to provide longitudinal retention of the adapter in the forward direction with respect to the yoke;

at its front longitudinal end, the body of the adapter comprises at least one retention tab which extends longitudinally forwards and which is shaped to collaborate with the yoke or a component borne by the yoke, so as to retain the adapter with respect to the yoke;

the at least one retention tab comprises a lower chamfer for the insertion of the adapter in a complementary part of the yoke or of a component borne by the yoke;

the body of the adapter comprises a locking tab which extends vertically projecting above the upper face of the body; which is configured to be received through a hole in the yoke; which bears a rear contact surface for contact with a transverse edge of the hole in the yoke; and which is connected to the body of the adapter by a vertical connecting part which is able to deform elastically so as to allow a longitudinal movement of the rear contact surface.

The invention also proposes an assembly comprising a wiper arm and an adapter according to the invention, characterized in that the yoke of the wiper arm is equipped with a front cap which covers the yoke and is opened vertically downwards.

The cap is mounted with the ability to slide longitudinally on the yoke.

The invention also proposes a motor vehicle wiper comprising a wiper blade and a connection assembly comprising an adapter according to the invention.

BRIEF DESCRIPTION OF THE FIGURES

Further features and advantages of the invention will become apparent from reading the detailed description which follows, for an understanding of which reference will be made to the attached drawings in which:

FIG. 4 is a large-scale perspective view in part section on a longitudinal vertical midplane, illustrating the fitting and assembly of the adapter according to a first embodiment in the yoke;

DETAILED DESCRIPTION OF THE FIGURES

In the remainder of the description, elements having the same structure or similar functions will be denoted by the same references.

In the remainder of the description, longitudinal, vertical and transverse orientations as indicated by the "L, V, T" trihedral frame of reference in the figures will be adopted nonlimitingly. A horizontal plane is also defined, which extends longitudinally and transversely.

Thus, in the description, the denominations longitudinal or lateral refer to the orientation of the wiper or of the drive arm.

The longitudinal direction corresponds to the main axis of the wiper or of the drive arm in which it extends from the rear forwards according to the orientation of the axis L of the trihedral frame of reference L, V, T.

Internal, external, interior or exterior directions may refer to a component in its entirety, and relate for example to the inside or the outside of this component.

Figure 1:
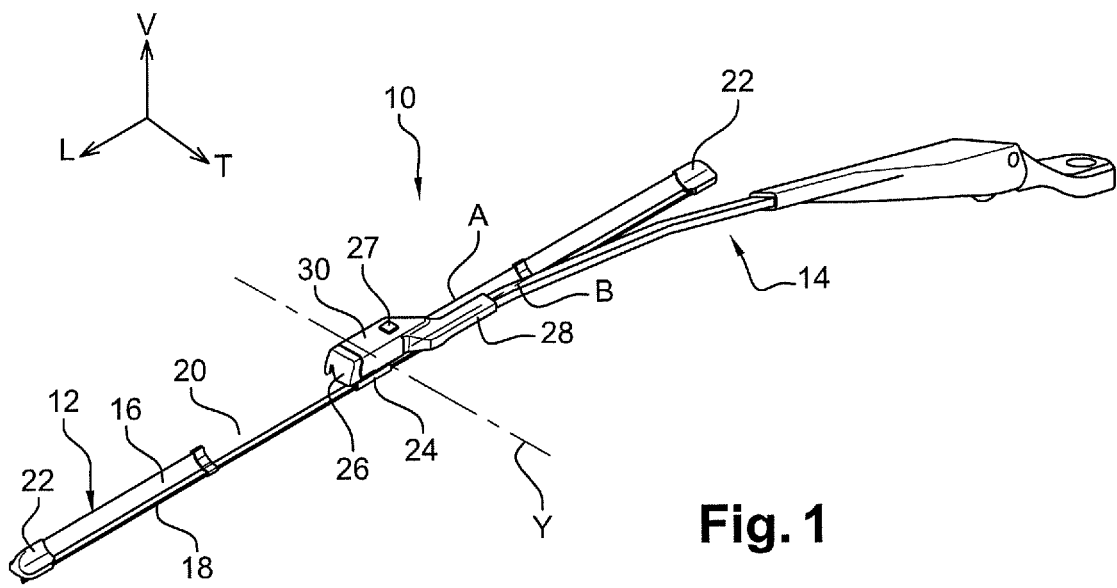
FIG. 1 is a schematic perspective view of a windscreen wiper comprising a wiper, a wiper drive arm, and a system for connecting the wiper to the drive arm.

FIG. 1 depicts a windscreen wiper 10 notably comprising a wiper 12 and a drive arm 14 (also referred to as a wiper arm) that drives the wiper 12.

The wiper 12 here is of the flat blade type and comprises a longitudinal body 16, a wiper blade 18, generally made from rubber or from an elastomeric material, and at least one backing strip (not depicted) which stiffens the blade and helps to press it against the exterior surface of a window of the vehicle such as, for example, a curved windscreen (not depicted) of the vehicle.

The longitudinal body 16 of the wiper 12 comprises an upper aerodynamic deflector 20 intended to improve the operation of the wiping system, the purpose of this deflector being to improve the pressing of the wiper 12 onto the windscreen, and therefore to improve the aerodynamic performance of the windscreen wiper 10.

The wiper 12 further comprises end pieces 22, or attachment clips, for attaching the blade 18 and the backing strip to the longitudinal body 16, these end pieces 22 being situated at each of the two opposite, front and rear, longitudinal ends of the longitudinal body 16.

The drive arm 14 is intended to be driven by a motor so that it follows a back-and-forth movement, for example an angular reciprocating movement, allowing the wiper blade 18 to remove the water and potentially other undesirable elements covering the exterior surface of the windscreen.

Substantially mid-way along its length, the wiper 12 comprises a connection assembly comprising an intermediate connector 24 and an adapter 26, 1026.

Two embodiments of an adapter 26, 1026 are depicted. The first embodiment is depicted in FIGS. 3 to 7. The second embodiment of the adapter is depicted in FIGS. 10 to 22.

Each adapter 26, 1026 is a component produced by moulding in a single piece and exhibits symmetry of design with respect to a longitudinal and vertical midplane.

The adapter 26, 1026 secured to the arm 14 is mounted on the connector 24 in such a way as to allow a degree of freedom in pivoting about a transverse axis of articulation Y which is substantially perpendicular to the longitudinal axis of the wiper 12.

This degree of freedom allows the wiper 12 to pivot in both directions with respect to the drive arm 14 and thus allows the wiper 12, as it moves, to conform to the curvature or curve of the windscreen.

The adapter 26, 1026 provides the connection between the wiper 12 and the drive arm 14 and, in particular, a head or front longitudinal terminal end piece of the drive arm 14 which may be formed as one piece with the drive arm or alternatively added and attached thereto.

In FIGS. 1 to 3 and 8, the end piece of the drive arm is a front free end portion in the form of a yoke 28 with a substantially inverted U-shaped cross section.

A cap 30 is mounted with the ability to slide on the free end yoke 28 and covers the yoke 28.

The yoke 28 has an elongate shape which extends along a longitudinal axis A which in general is substantially parallel to the overall longitudinal axis of the wiper 12.

The yoke 28 comprises a connecting part 31 for connection to the rest of the drive arm 14, to which part this yoke is attached for example by crimping.

Figure 2:
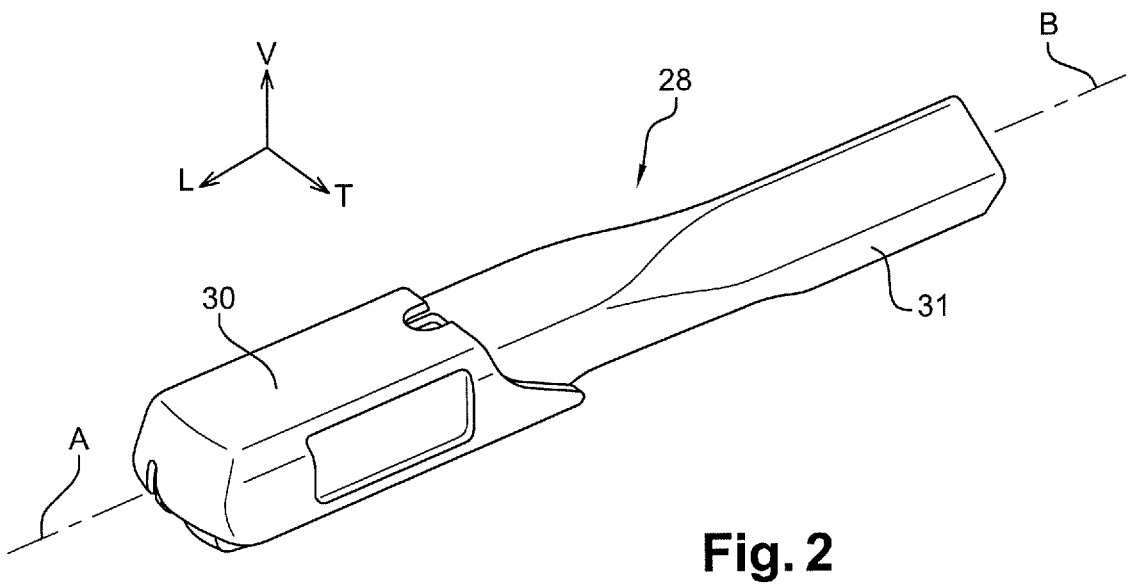
FIG. 2 is a schematic perspective view, on a larger scale, of a front part of a wiper arm notably equipped with a sliding cap.
Figure 3:
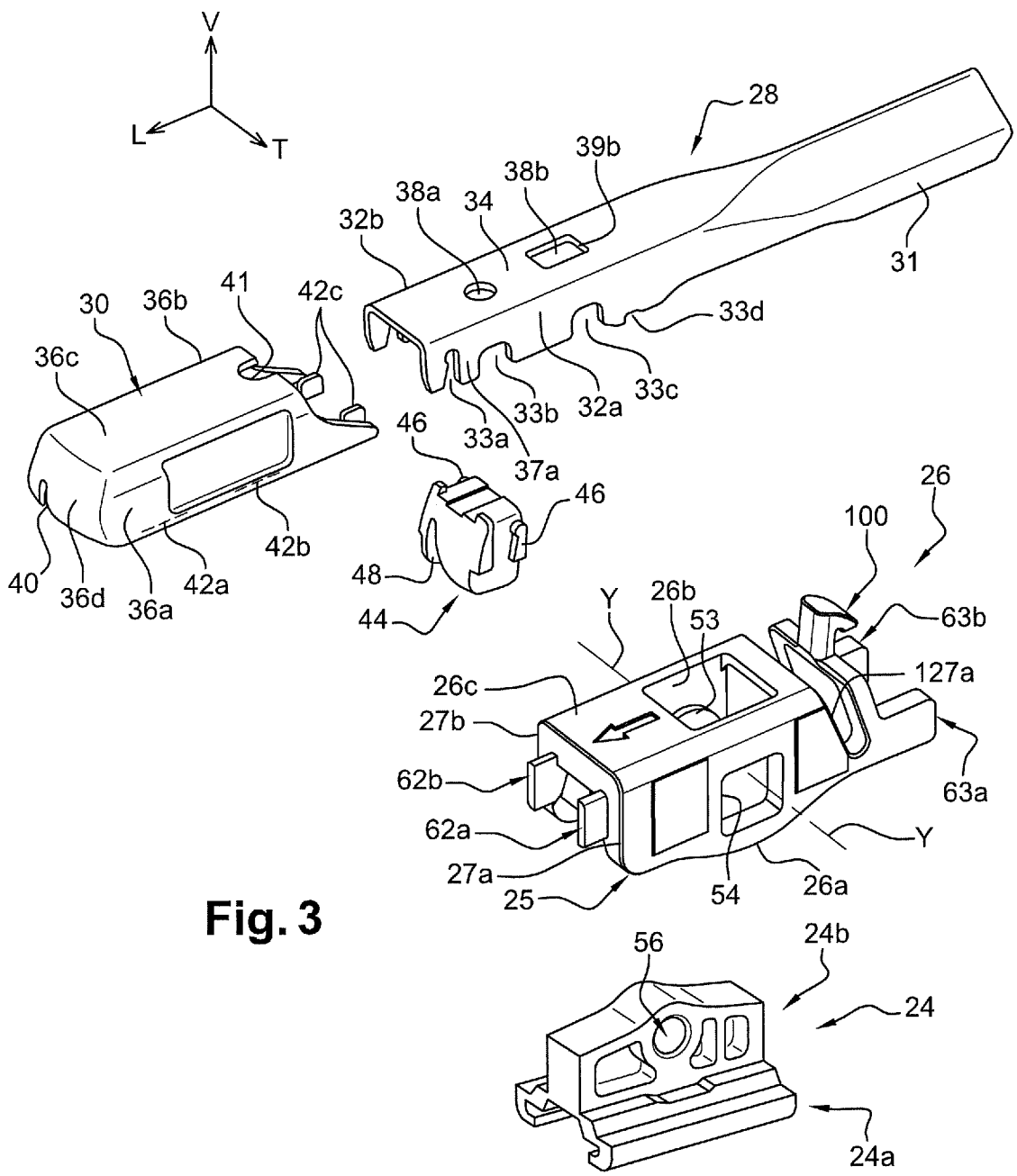
FIG. 3 is a schematic exploded perspective view of the components of the wiper arm of FIG. 2 in combination with one example of a complementary connector of an adapter according to a first embodiment.

The part 31 has an elongate overall shape and extends along a longitudinal axis B substantially parallel to the axis A and offset laterally or transversely with respect to the axis A as can be seen in FIGS. 1 and 2. The part 31 is connected to a rear end of the yoke 28.

The yoke 28 comprises two longitudinally oriented vertical lateral walls 32a, 32b the upper longitudinal edges of which are joined together by a longitudinally oriented upper transverse wall 34. The walls 32a, 32b and 34 between them delimit an interior space to house the adapter 26.

The lateral walls 32a, 32b comprise a series of through-notches 33a, 33b, 33c, 33d which are open vertically downwards and open into their lower longitudinal edges 37a, 37b.

The notches 33a, 33b, 33c, 33d in each wall 32a, 32b are four in number in this instance and are spaced apart and arranged longitudinally one behind the other.

The front notch 33a in each lateral wall 32a, 32b, which is situated longitudinally furthest forward, has a longitudinal width which is relatively small by comparison with the other notches and extends vertically substantially over the entire height of the corresponding lateral wall 32a, 32b.

The rear notch 33d, situated longitudinally furthest towards the rear, has a height that is relatively small in comparison with that of the other notches.

The intermediate notches 33b, 33c between the front notch 33a and rear notch 33d have a longitudinal width that is relatively great in comparison with that of the front notch 33a, and these extend vertically substantially as far as midway up the height of the corresponding lateral wall 32a, 32b.

The upper wall 34 comprises two through-openings 38a, 38b arranged longitudinally one behind the other. The front opening 38a has a substantially circular contour and the rear opening 38b has a substantially rectangular contour.

In section on a vertical and transverse plane, the cap 30 has a cross section substantially in the shape of an inverted U.

The cap 30 comprises two longitudinal and vertical lateral walls 36a, 36b, the upper longitudinal edges of which are joined together by a longitudinal and horizontal upper wall 36c.

The front vertical edges of the lateral walls 36a, 36b and upper wall 36c are also joined together by a generally vertically and transversely oriented front wall 36d of the cap.

When the cap 30 is in the fitted position, its upper wall 36c covers the upper wall 34 of the yoke 28 and its lateral walls 36a, 36b extend longitudinally one on each side of the yoke, facing the external faces of the lateral walls 32a, 32b (see FIG. 2).

The front wall 36d of the cap extends forward from the yoke 28 and comprises a vertical slot 40 able to accept an opposing portion of the upper part of the deflector 20 of the wiper 12, visible in FIG. 1.

At its rear end, the upper wall 36c of the cap 30 comprises a notch 41 with the overall shape of a C, which opens longitudinally into the free rear transverse edge of the upper wall 36c.

The cap 30 is capable of longitudinal translational movement on the yoke 28 of the drive arm 14, between a rear position depicted in FIG. 2 and a forward position that is offset longitudinally with respect to the rear position.

In the forward position, the notch 41 of the cap 30 may be situated in line with the front opening 38a of the yoke whereas, in the rear position, the notch 41 may be situated in line with the rear opening 38b.

To achieve that, the cap 30 comprises longitudinal translation guide means intended to collaborate with the yoke 28.

Each lateral wall 36a, 36b of the cap 30 comprises a guide rail arranged at its lower longitudinal edge. Each guide rail takes the form of a series of substantially coplanar longitudinal flanges 42a, 42b, 42c extending transversely inwards.

The three longitudinal flanges 42a, 42b, 42c of each wall 36a, 36b are arranged longitudinally one behind the other and are spaced from one another.

As the cap 30 slides longitudinally along the yoke 28 of the drive arm 14, the flanges 42a, 42b, 42c of the cap 30 may collaborate in sliding with the free lower edges of the lateral walls 32a, 32b of the yoke 28.

As illustrated in FIGS. 3, 4 and 15 to 22, a front longitudinal end piece 44 is mounted at the front free end of the yoke 28 of the drive arm 14 to close the aforementioned yoke space in which an elongate rear body 25, 1025 of the adapter 26, 1026 is housed.

The end piece 44 takes the form of a block of material, preferably elastic material, comprising two opposed lateral fixing ribs 46 each of which is formed in relief on a vertical lateral face and extends vertically overall. The end piece 44 is for example produced by injection moulding.

Each fixing rib 46 is intended to be engaged in a front notch 33a of the associated lateral wall 32a, 32b of the yoke 28 in order to fix and hold the end piece 44 on the yoke 28.

The end piece 44 further comprises a vertical slot 48 able to accept an opposing portion of the upper part of the deflector 20 of the wiper 12.

In the first embodiment depicted in FIGS. 3 to 7, the adapter 26 comprises an elongate rear main body 25 which is shaped to be mounted in the yoke 28.

In section on a transverse vertical plane, the adapter is substantially in the shape of an inverted U. It comprises two longitudinal and vertical lateral walls 26a, 26b which are delimited longitudinally towards the front by a front longitudinal end vertical edge 27a, 27b and longitudinally towards the rear by a rear longitudinal end vertical edge 127a, 127b.

The two lateral walls 26a, 26b are joined together by a horizontal upper wall 26c.

The lateral walls 26a, 26b respectively comprise an orifice 54 and a trunnion 53 which are aligned transversely. These elements 53 and 54 are situated longitudinally substantially in the middle of the lateral walls 26a, 26b of the adapter 26.

In the known way, the elements 53 and 54 define the substantially transverse axis Y of pivoting articulation of the connector 24 with respect to the adapter 26 and therefore of the wiper 12 with respect to the drive arm 14.

The connector 24 essentially comprises a lower part 24a for crimping or fixing to the rest of the wiper 12, and an upper part 24b intended to be housed between the internal faces of the lateral walls 26a, 26b of the adapter 26.

The upper part 24b comprises means 56 that complement the elements 53 and 54 intended to be aligned with the axis Y.

As an alternative, of the adapter 26 and the connector 24 one may comprise cylindrical trunnions centred on the axis Y and intended to be engaged by elastic clip-fastening into a complementary orifice or orifices of the other of these components.

At its front longitudinal end, the body 25 of the adapter 26 here—nonlimitingly—comprises two retention tabs 62a, 62b each of which extends longitudinally forwards in the continuation of an associated lateral wall 26a, 26b of the body 25 of the adapter 26.

Each retention tab 62a, 62b is shaped to collaborate with the yoke 28 or a component borne by the yoke 28.

Here, the retention tabs 62a and 62b are intended to be engaged in complementary recesses of the end piece 44 mounted at the front free end of the yoke 28 of the arm, also allowing the positioning of the adapter 26.

The retention tabs 62a and 62b are substantially parallel, they each have the overall shape of a rectangular parallelepiped, and they extend vertically over the majority of the height of the lateral walls 26a and 26b.

By way of an alternative which has not been depicted, the body 25 of the adapter 26 may comprise one single retention tab which extends horizontally and longitudinally forwards in the continuation of the horizontal upper wall 26c of the body 25 of the adapter 26 and which is shaped to collaborate with the yoke 28 or a component borne by the yoke 28.

By way of nonlimiting example, at its rear longitudinal end, the body 25 of the adapter 26 here comprises two retention tabs 63a, 63b each of which extends longitudinally rearwards in the continuation of an associated lateral wall 26a, 26b of the body 25 of the adapter 26.

Each retention tab 63a, 63b is shaped to collaborate with the yoke 28 or a component borne by the yoke 28.

The retention tabs 63a and 63b are substantially parallel, they each have the overall shape of a rectangular parallelepiped and they extend vertically over a lower part of the height of the lateral walls 26a and 26b.

In the vicinity of its rear longitudinal end, the body 25 of the adapter 26 comprises a locking tab 100 which is configured to be received through a hole in the yoke 28 which in this instance is the rear opening 38b of substantially rectangular contour in the upper wall 34 of the yoke 28.

The rear opening or hole 38b is delimited longitudinally towards the rear by a rear transverse edge 39b with which the locking tab 100 collaborates as will be explained later on.

Figure 6:
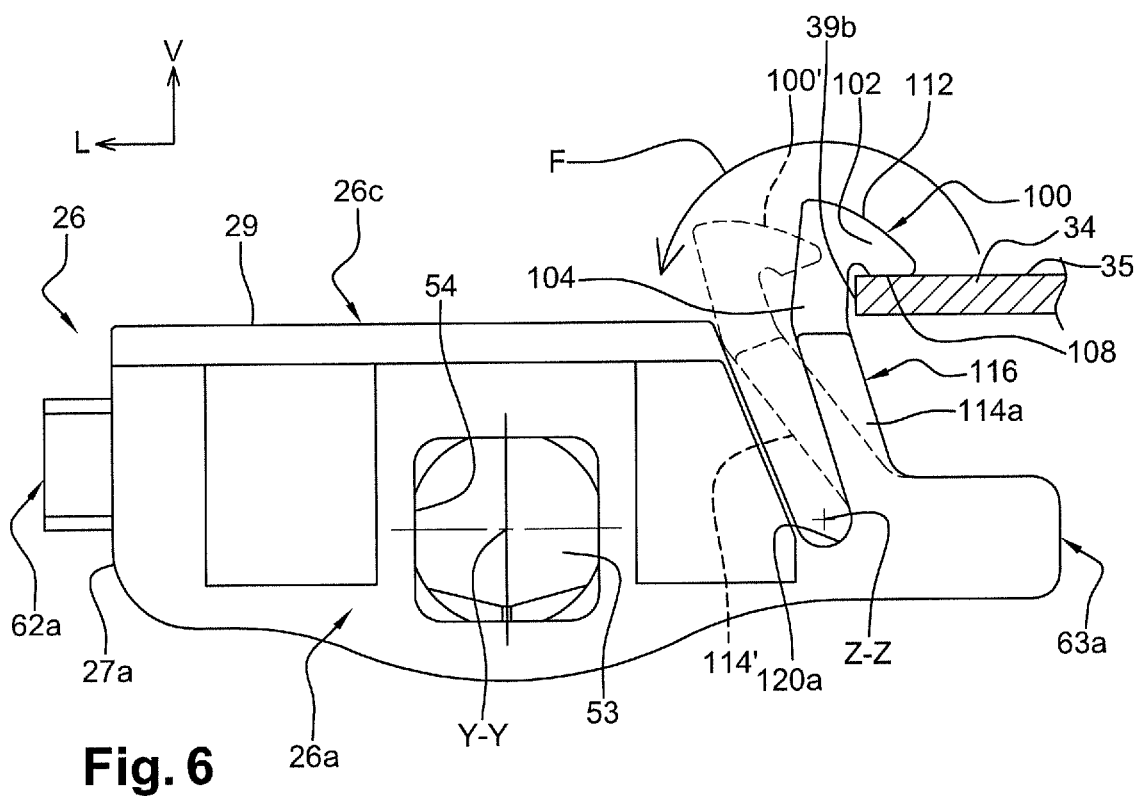
FIG. 6 is a side view of the adapter of FIGS. 5A and 5B.

As can be seen notably in FIG. 6, the locking tab 100 extends vertically projecting above the horizontal plane of the external face 29 of the upper wall 26c of the body 25 of the adapter 26.

The retention tabs 62a, 62b and the locking tab 100 are arranged longitudinally on each side of the axis Y-Y of pivoting articulation of the adapter 26 with respect to the connector 24.

The locking tab 100 is positioned longitudinally between the axis Y-Y of pivoting articulation of the adapter 26 with respect to the connector 24 and the retention tabs 63a, 63b.

The locking tab 100 is configured to be received through the opening 38b in the yoke 28 and comprises a free upper part 102 which is shaped into a hook.

Figure 5A:
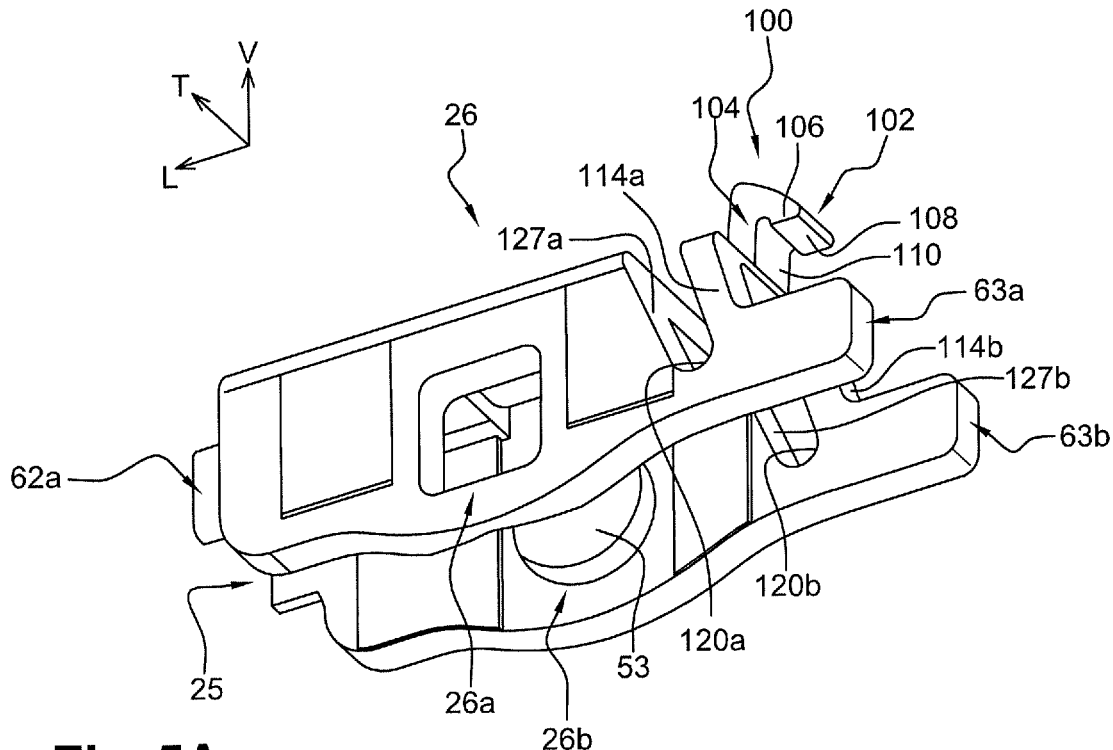
FIGS. 5A and 5B are two large-scale perspective views of the adapter according to a first embodiment.
Figure 5B:
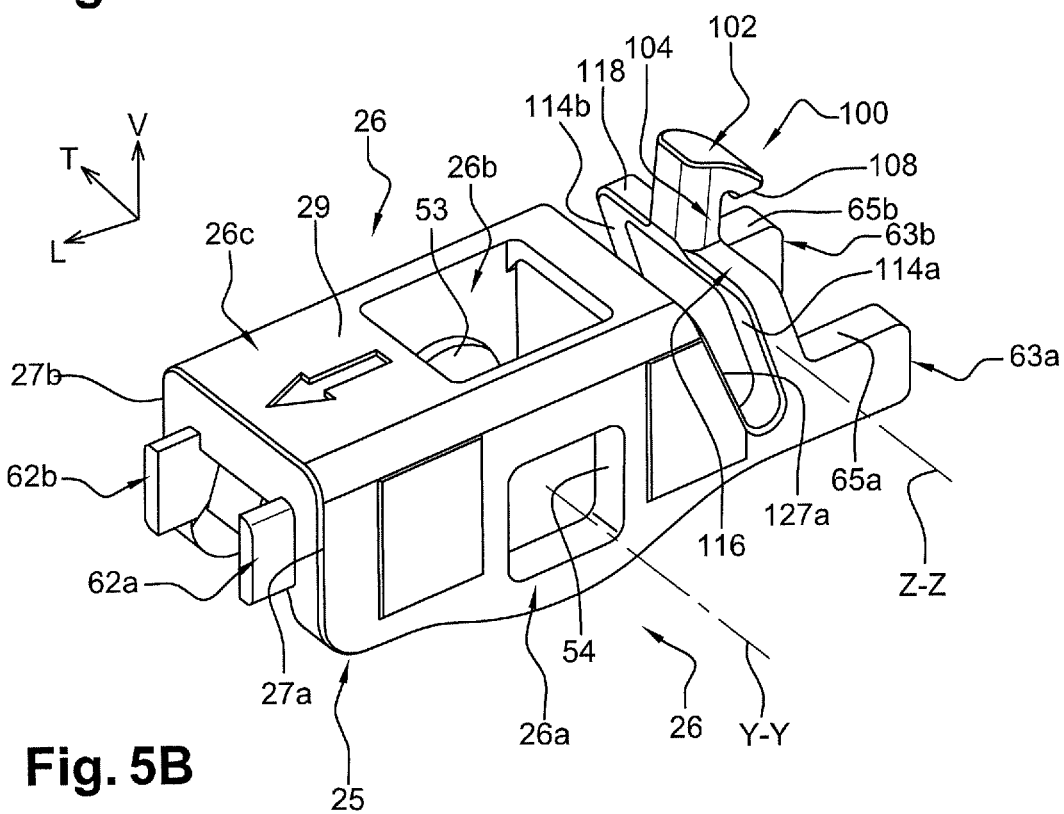

As can be seen notably in the perspective views of FIGS. 5A and 5B, this hook-shaped part 102 is a solid part centred transversely with respect to the body 25 of the adapter 26.

The hook-shaped part 102 comprises a vertical central branch 104 which is extended by a locking branch 106 which extends longitudinally rearwards.

The locking branch 106 is delimited, vertically downwards, by a lower face 108 shaped into a facet, in this instance oriented horizontally overall, which is configured to collaborate with an opposing portion of the external face of the yoke 28.

In the mounted and locked position, the lower face 108 bears against a portion 35 of the external surface of the upper wall 34 of the yoke 28 which is situated immediately to the rear of the rear transverse edge 39b of the rear opening 38b.

The vertical branch 104 of the hook-shaped part 102 of the locking tab 100 comprises a rear surface 110 for contact with the rear transverse edge 39b of the rear opening 38b of the yoke 28.

The rear contact surface 110 is, in this instance—by way of nonlimiting example—a planar surface which extends in a plane that is vertical overall and which is able to come into contact with the rear transverse edge 39b of the rear opening 38b of the yoke 28 which is a rectilinear transverse edge.

The upper part of the locking branch 106 of the hook-shaped part 102 comprises a profiled surface portion 112 forming a cam which is able to collaborate with the rear transverse edge 39b of the rear opening 38b of the yoke 28 in order to cause the hook 102 to move longitudinally forwards with respect to the body 25 of the adapter 26.

The profiled surface 112 in this instance is a portion of an arc of a cylinder which is convex.

The locking tab 100 is connected to the body 25 of the adapter 26 by a vertical connecting part which is able to deform elastically to allow longitudinal movement—in both directions—of the rear contact surface 110 with respect to the body 25 of the adapter 26.

In the embodiment illustrated in FIGS. 3 to 7, the vertical connecting part which connects the locking tab 100 to the body 25 of the adapter 26 comprises two transversely opposed lateral connecting branches 114a, 114b.

Each connecting branch 114a, 114b extends vertically overall, in this instance being inclined forwards from the bottom up.

Each connecting branch 114a, 114b extends upwards from the upper face 65a, 65b of an associated retention tab 63a, 63b, in the vicinity of the rear end of the latter.

The upper ends of the two connecting branches 114a, 114b are connected to one another by an upper crosspiece 116 which extends horizontally and which comprises a horizontal upper face 118 from which the vertical central branch 104 of the hook-shaped part 102 of the locking tab 100 extends vertically upwards overall.

The vertical connecting part formed by the two connecting branches 114a and 114b extends vertically below the horizontal plane of the external face 29 of the upper wall 26c of the body 25 of the adapter 26.

The vertical connecting part formed by the two connecting branches 114a and 114b is able to deform elastically so as to pivot with respect to the body 25 of the adapter 26 about a transverse axis Z-Z which is adjacent to the lower end of each of the two connecting branches 114a and 114b.

This transverse axis of pivoting Z-Z is positioned vertically below the horizontal plane of the external face 29 of the upper wall 26c of the body 25 of the adapter 26.

To facilitate elastic deformation of the vertical connecting part and movements in pivoting about the transverse axis Z-Z, a recess 120a, 120b is formed at the front of the lower end of the connecting branch 114a, 114b in the part of material that connects the retention tab 63a, 63b to its associated lateral wall of the body 25 of the adapter 26.

The ability of the lower connecting part to deform elastically and to pivot about the transverse axis Z-Z is illustrated in FIG. 6 in which the locking tab 100 with its lower connecting part is depicted in solid line in its undeformed free state, and in dotted line 100', 114' in a state in which it is deformed and pivoted in the anticlockwise direction indicated by the arrow F.

One step in mounting and assembling the adapter 26 in the yoke 28 is illustrated schematically and partially in FIG. 4.

As can be seen, after the retention tabs 62a, 62b have been engaged in the complementary recesses of the end piece 44 mounted at the front free end of the yoke 28 of the arm, the adapter 26 is brought into the position illustrated in FIG. 4, in which a portion of the convex profiled surface 112 comes into contact with the rear transverse edge 39b of the rear opening 38b of the yoke 28.

By continuing, under load, the relative movement of the adapter 26 with respect to the yoke so as to introduce the locking tab 100 through the rear opening 38b, a cam effect occurs between the surface 112 and the edge 39b and causes the fixing tab to pivot more or less about the transverse axis Z-Z.

As soon as the lower face 108 passes above the external surface portion 35, the locking tab 100 is returned elastically to its almost undeformed free state and the rear contact surface 110 comes into contact with the rear transverse edge 39b of the rear opening 38b of the yoke 28, bearing against the latter with a slight elastic contact and bearing-together load in the longitudinal direction overall.

When there is a desire to dismantle the wiper, the hook-forming upper part 102 is projecting above the external surface of the upper wall 34 of the yoke 28.

It therefore constitutes an unlocking "button" upon which the user can act by moving it longitudinally forwards against the elasticity of the vertical connecting part 114a, 114b.

To make this action easier, the convex profiled surface may be ribbed or provided with any suitable special surface finish.

It is desirable to avoid any risk of accidental separation between the wiper arm and the wiper, and thus avoid a loss of wiper, even under heavy load.

Such heavy load occurs notably when the windscreen wiper is being used on a glazed surface that is covered with ice or with a substantial layer of snow.

For that purpose, in order to avoid any risk of the locking tab 100, and notably the hook-forming free upper part 102 thereof, breaking under load, the locking branch 106 is able to deform elastically—under the action of a force applied to it by the yoke—with respect to the vertical branch 104.

Figure 7:
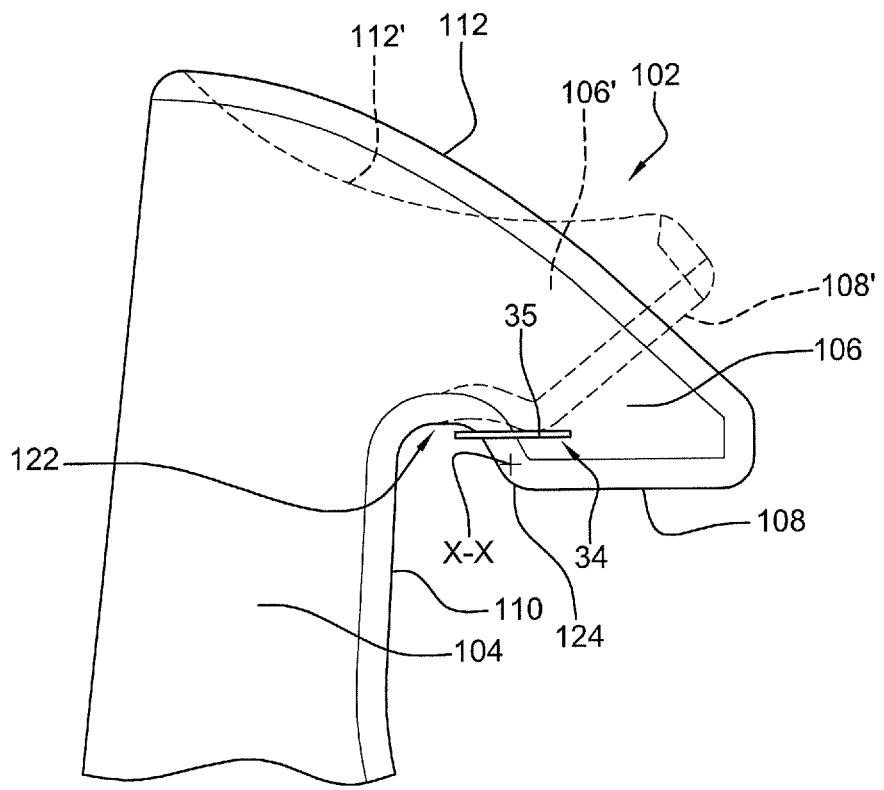
FIG. 7 is a large-scale view of the hook-shaped upper part of the locking tab of the adapter of FIG. 6.
Figure 8:
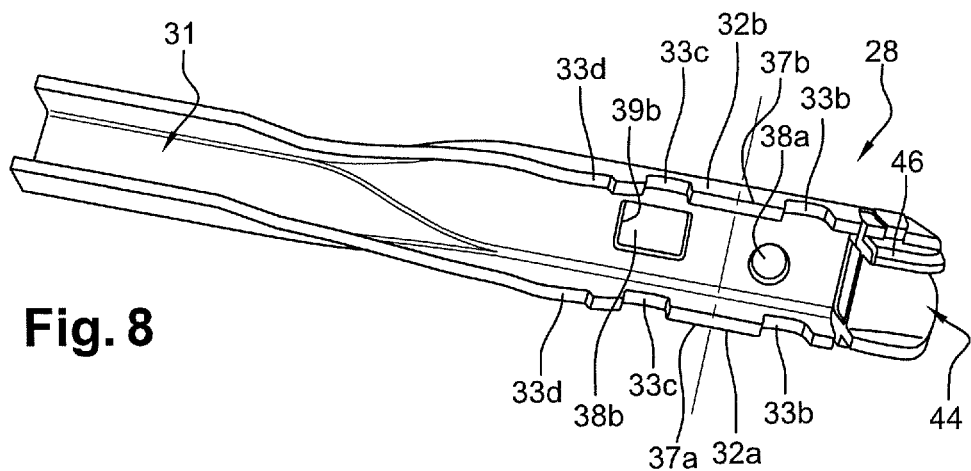
FIG. 8 is a perspective view from beneath of the yoke of the drive arm of FIG. 1 fitted with the end piece.
Figure 9:
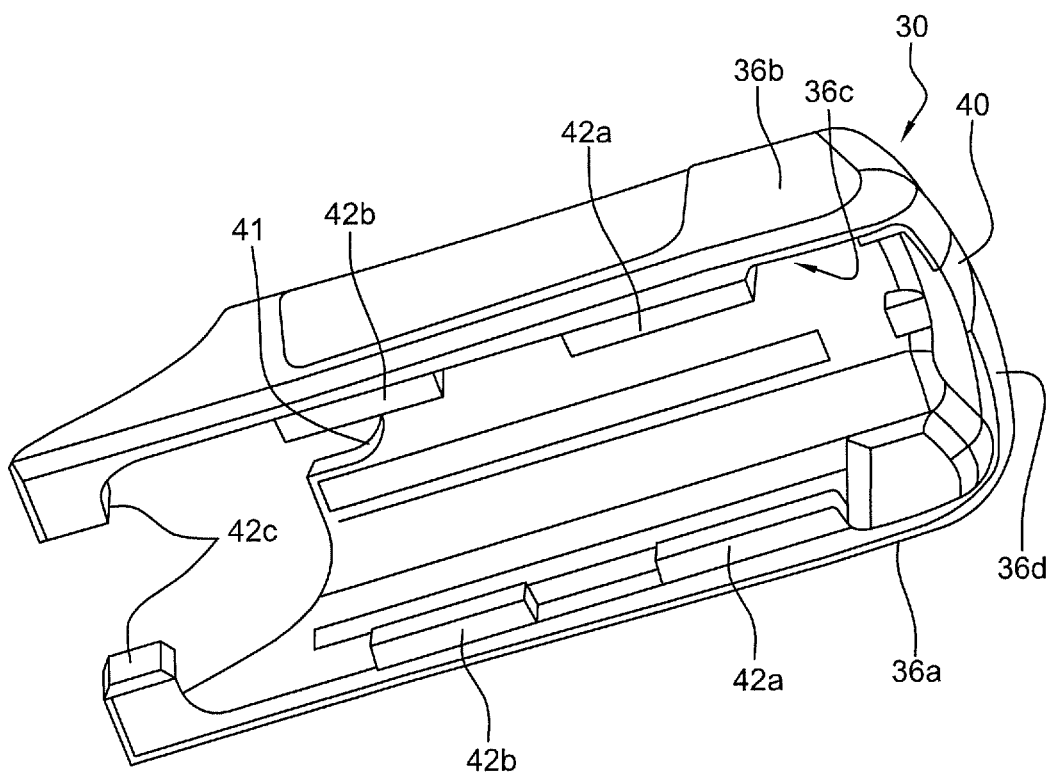
FIG. 9 is a perspective view from beneath of the sliding cap of FIG. 1.
Figure 10:
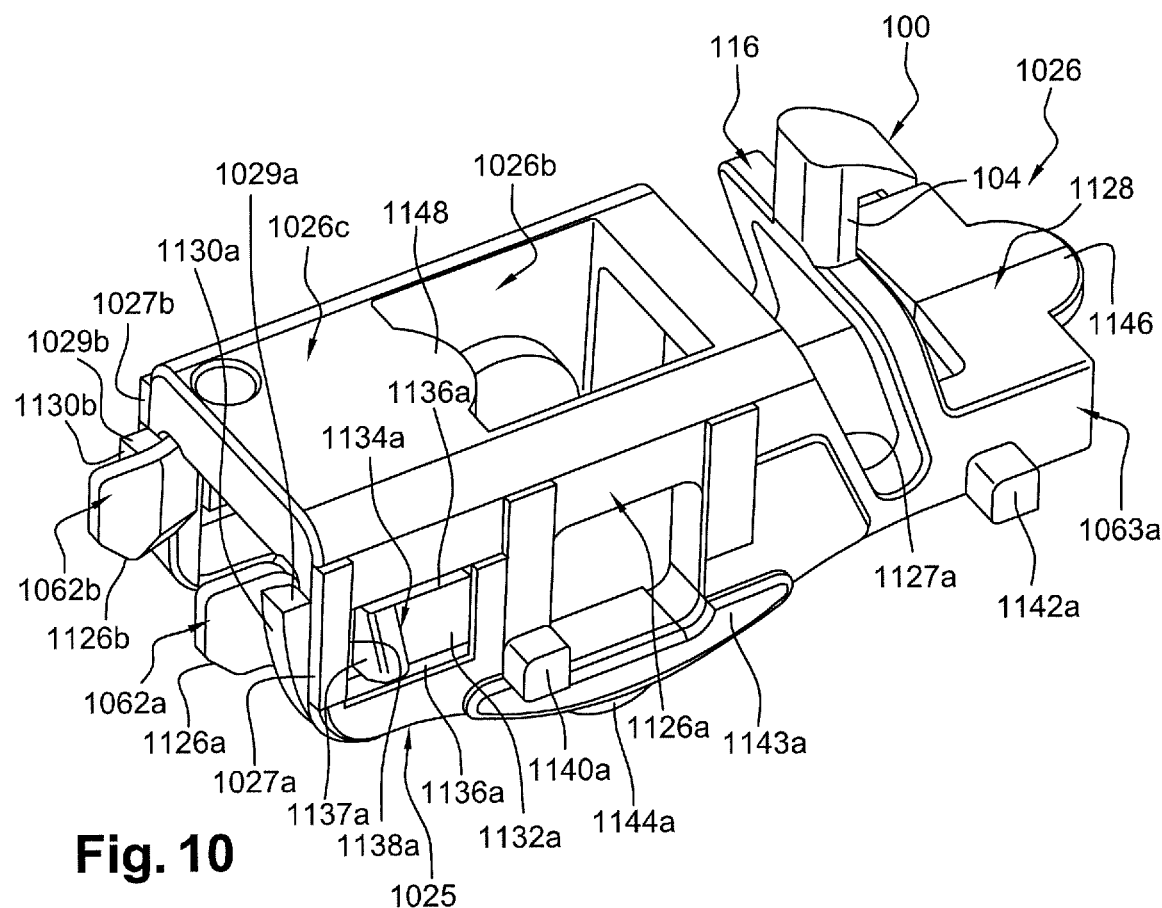
FIGS. 10 and 11 are two large-scale detail views, from different perspectives, illustrating an adapter according to a second embodiment.
Figure 11:
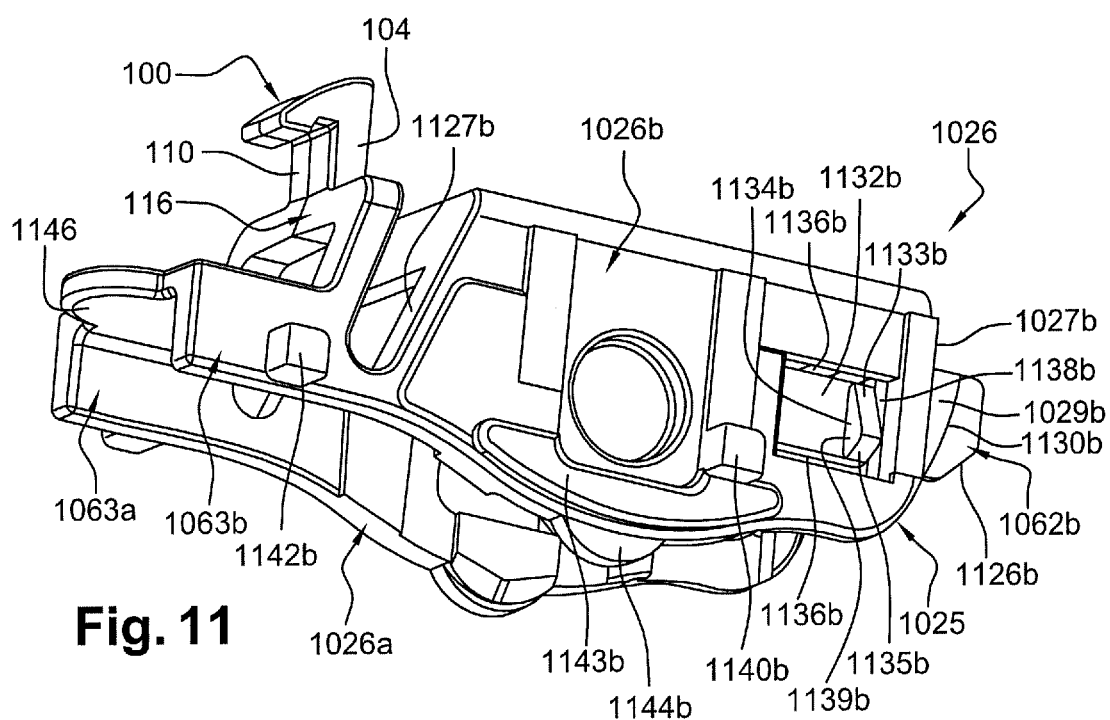

As can be seen in FIG. 7 and by virtue of such an ability to deform elastically, the locking branch 106 is notably able to pivot with respect to the vertical branch 104 about a transverse axis X-X.

The transverse axis X-X here is adjacent to the rear end edge of the lower face 108 and is substantially adjacent to the vertical branch 104.

In order to make it easier for the locking branch 106 to deform elastically and perform its pivoting movements about the transverse axis X-X, the hook-shaped part 102 comprises a recess 122 which is formed in the region of connection between the vertical branch 104 and the locking branch 106.

The recess 122 is formed here in the continuation of the lower face 108 of the locking branch 106.

The recess 122 is a transversely oriented groove.

As can be seen on a large scale in FIG. 7, the lower face 108 of the locking branch 106 is connected to the groove 122 by a transverse edge corner 124 which is able to collaborate with the opposing portion 35 of the external surface of the upper wall 34 of the yoke 28.

The ability of the locking branch to deform elastically without breaking and to pivot about the transverse axis X-X is illustrated in FIG. 7 in which the locking branch 106 is depicted in solid line in its undeformed free state, and in dotted line 106', 108', 112' in a state in which it is deformed and pivoted in the anticlockwise direction.

The adapter 1026 according to the second embodiment is substantially similar in form and overall design to the adapter 26 of the first embodiment.

The adapter 1026 comprises an elongate rear main body 1025 which is shaped to be mounted in the yoke 28.

In section on a transverse vertical plane, the adapter 1026 is substantially in the shape of an inverted U. It comprises two vertical and longitudinal lateral walls 1026a, 1026b which are delimited longitudinally towards the front by a front longitudinal end vertical edge 1027a, 1027b and longitudinally towards the rear by a rear longitudinal end vertical edge 1127a, 1127b.

The two lateral walls 1026a, 1026b are joined together by a horizontal upper wall 1026c.

As in the first embodiment, the body 1025 of the adapter 1026 comprises a locking tab 100 configured to be received through a hole in the yoke 28 which in this instance is the rear opening 38b of substantially rectangular contour of the upper wall 34 of the yoke 28.

The locking tab 100 is connected to the body 1025 of the adapter 1026 by a vertical branch 104 which is able to deform elastically so as to allow the rear contact surface 110 to move longitudinally—in both directions—with respect to the body 1025 of the adapter 1026.

At its front longitudinal end, the body 1025 of the adapter 1026 also comprises two retention tabs 1062a, 1062b each of which extends longitudinally forwards in the continuation of an associated lateral wall 1026a, 1026b of the body 1025 of the adapter 1026.

The retention tabs 1062a and 1062b are substantially parallel. They each have the overall shape of a rectangular parallelepiped.

Each of the retention tabs 1062a, 1062b comprises a lower chamfer 1126a, 1126b which is formed on its lower edge.

Each retention tab 1062a, 1062b is shaped to collaborate with the yoke 28 or a component borne by the yoke 28. The chamfers 1126a, 1126b make it easier to insert the adapter 1026 in the yoke 28 or a component borne by the yoke 28, such as the end piece 44 as depicted here by way of nonlimiting example.

The retention tabs 1062a, 1062b provide vertical retention of the adapter 1026.

By way of nonlimiting example, at its rear longitudinal end, the body 1025 of the adapter 1026 comprises two retention tabs 1063a, 1063b each of which extends longitudinally rearwards in the continuation of an associated lateral wall 1026a, 1026b of the body 1025 of the adapter 1026.

Each retention tab 1063a, 1063b is shaped to collaborate with the yoke 28 or a component borne by the yoke 28.

The retention tabs 1063a and 1063b are substantially parallel. They are connected by a transverse and horizontal rear cross member 1128.

Each of the retention tabs 1063a, 1063b has the overall shape of a rectangular parallelepiped and extends vertically over a lower part of the height of the associated vertical lateral walls 1026a and 1026b.

The retention tabs 1063a, 1063b have a rear end that comes into abutment against the yoke 28 or a component borne by the yoke 28.

The rear cross member 1128 extends horizontally between the two retention tabs 1063a, 1063b. It connects the rear ends of the retention tabs 1063a, 1063b.

The width of the rear cross member 1128—measured in the longitudinal direction—corresponds to more than half the length of the retention tabs 1063a, 1063b.

The length of the retention tabs 1063a, 1063b is calculated such that the rear end of each of the retention tabs 1063a, 1063b comes into abutment with the yoke 28 or a component borne by the yoke 28.

The retention tabs 1063a, 1063b thus serve to retain the adapter in the rearwards longitudinal direction. They notably make it possible to avoid damage to the locking tab 100 if the wiper is pulled longitudinally rearwards with respect to the yoke 28.

The rear cross member 1128 makes it possible to increase the rigidity of the rear end part of the adapter 1026, particularly to increase the rigidity of the retention tabs 1063a, 1063b.

By way of nonlimiting example, at its front longitudinal end, the body 1025 of the adapter 1026 comprises two front stops 1029a, 1029b of convex curved or curled profile, delimiting, for each of these end stops, a convex curved stop surface 1130a, 1130b for longitudinally positioning the adapter 1026 with respect to the yoke 28 or a component such as the end piece 44 borne by the yoke 28.

Each of the stops 1029a, 1029b extends vertically downwards in a curve in the continuation of an associated lateral wall 1026a, 1026b of the body 1025 of the adapter 1026.

Each of the curved stops 1029a, 1029b laterally abuts an external face of an associated retention tab 1062a, 1062b.

Figure 12:
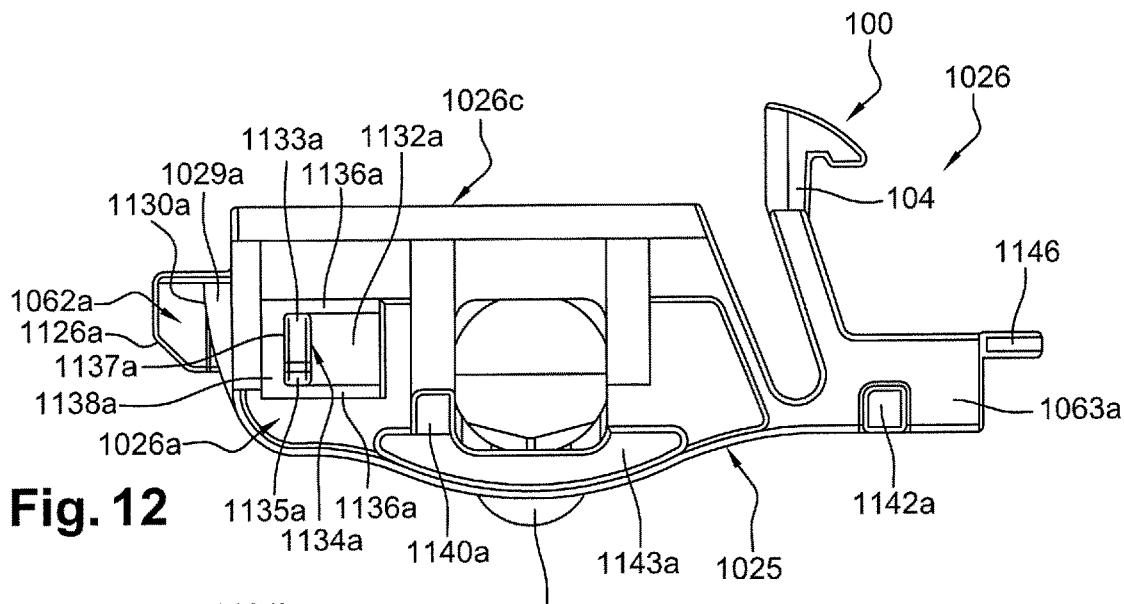
FIG. 12 is a side view of the adapter illustrated in FIGS. 10 and 11.
Figure 13:
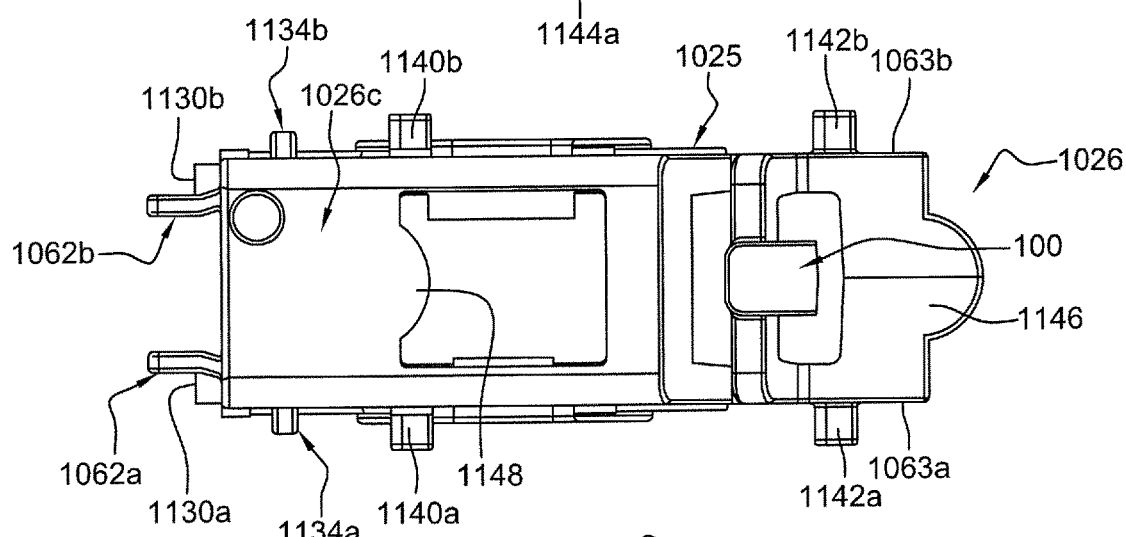
FIG. 13 is a view from above of the adapter illustrated in FIGS. 10 and 11.
Figure 14:
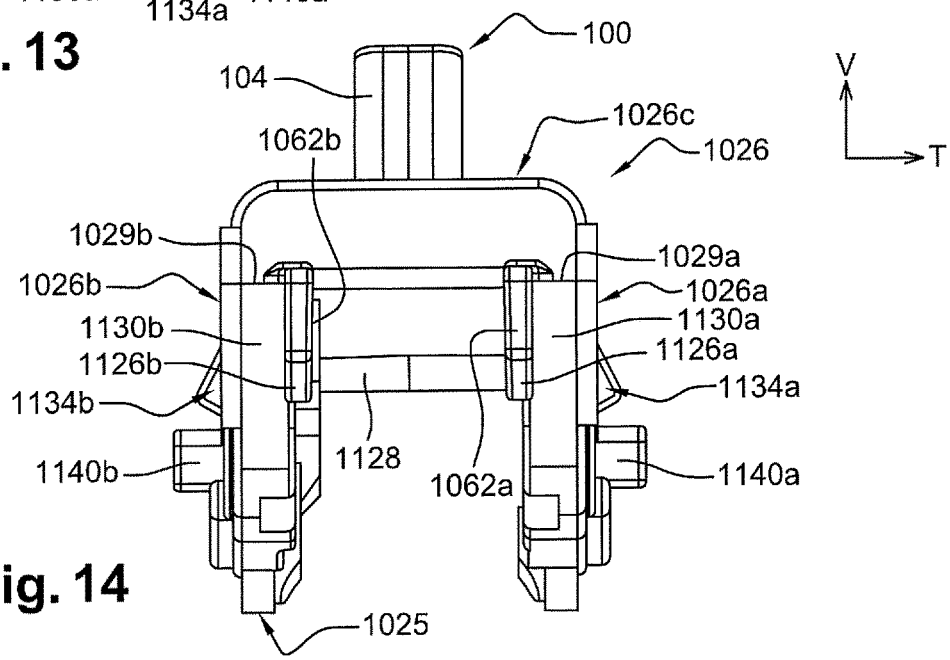
FIG. 14 is an end-on view of the front longitudinal end of the adapter illustrated in FIG. 13.
Figure 15:
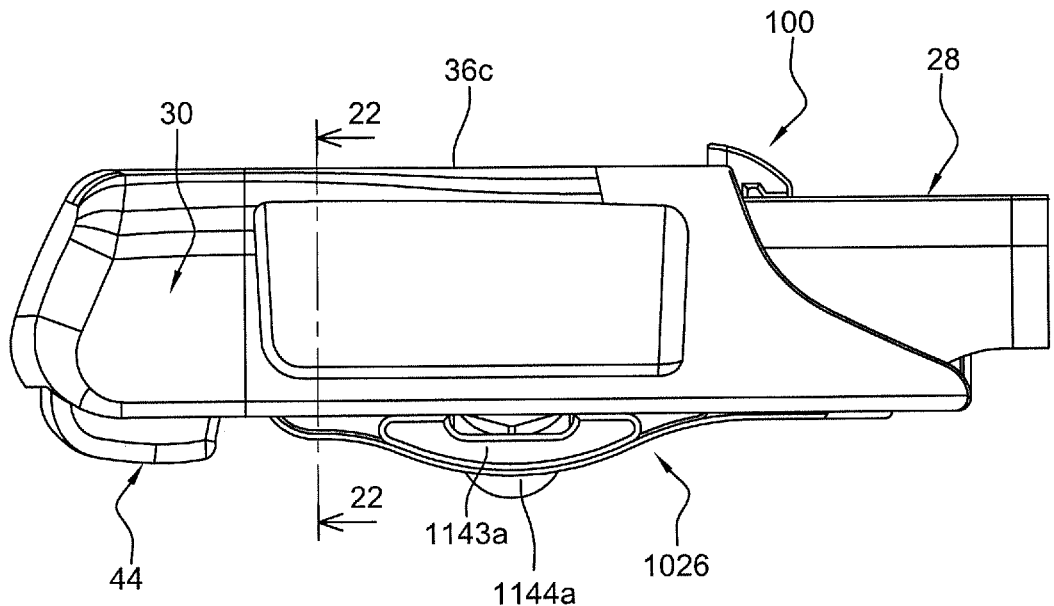
FIG. 15 is a side view of the adapter according to the second embodiment, with the adapter depicted in a position in which it is mounted in the drive arm fitted with its sliding cap and with the end piece.
Figure 16:
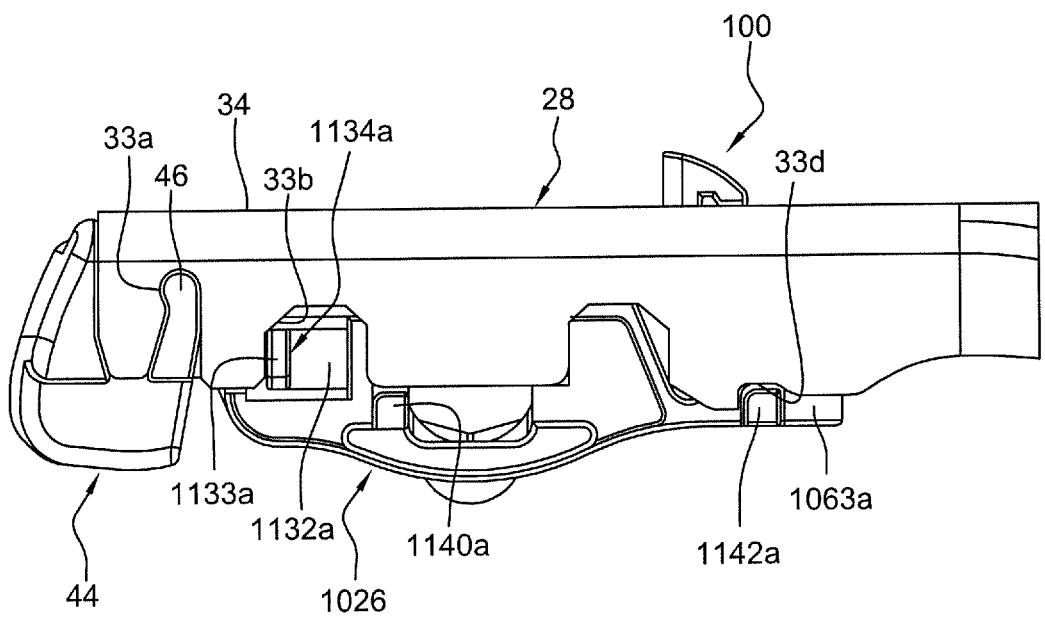
FIG. 16 is a view similar to that of FIG. 15, without the sliding cap.
Figure 17:
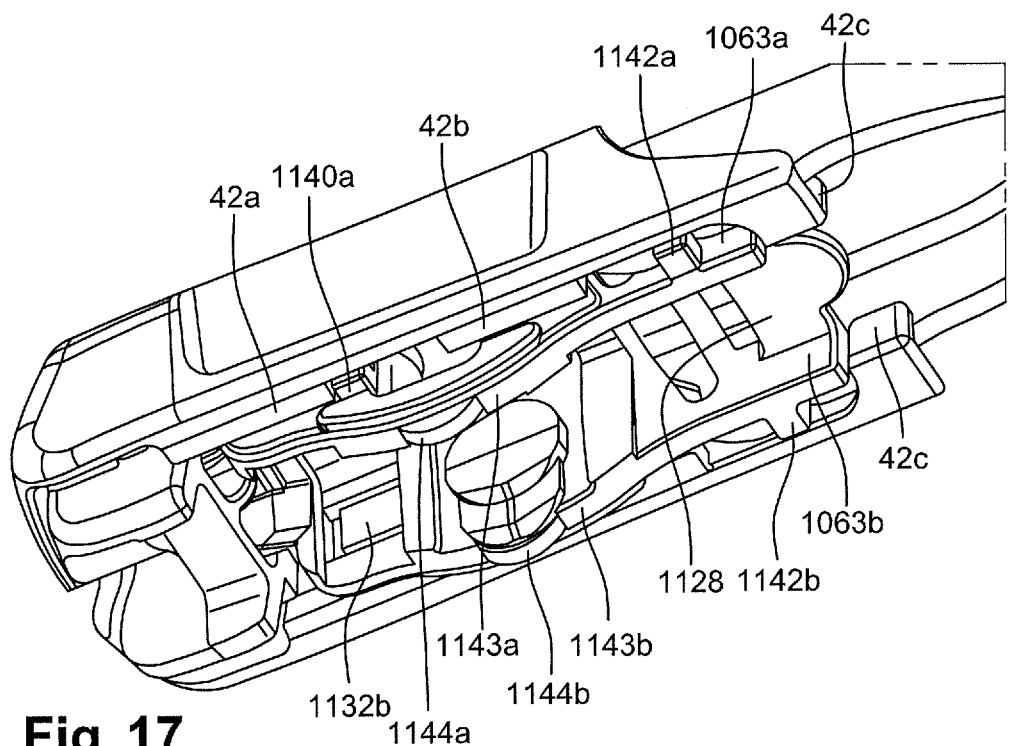
FIG. 17 is a perspective view from beneath of the assembly illustrated in FIG. 15.
Figure 18:
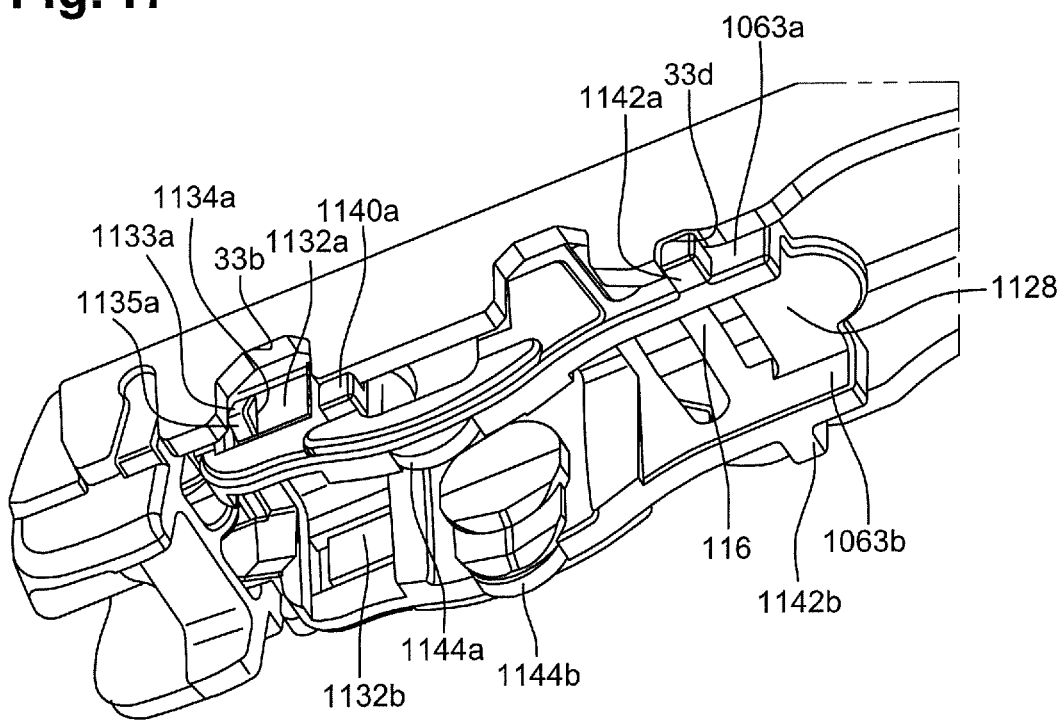
FIG. 18 is a perspective view from beneath of the assembly illustrated in FIG. 16.
Figure 19:
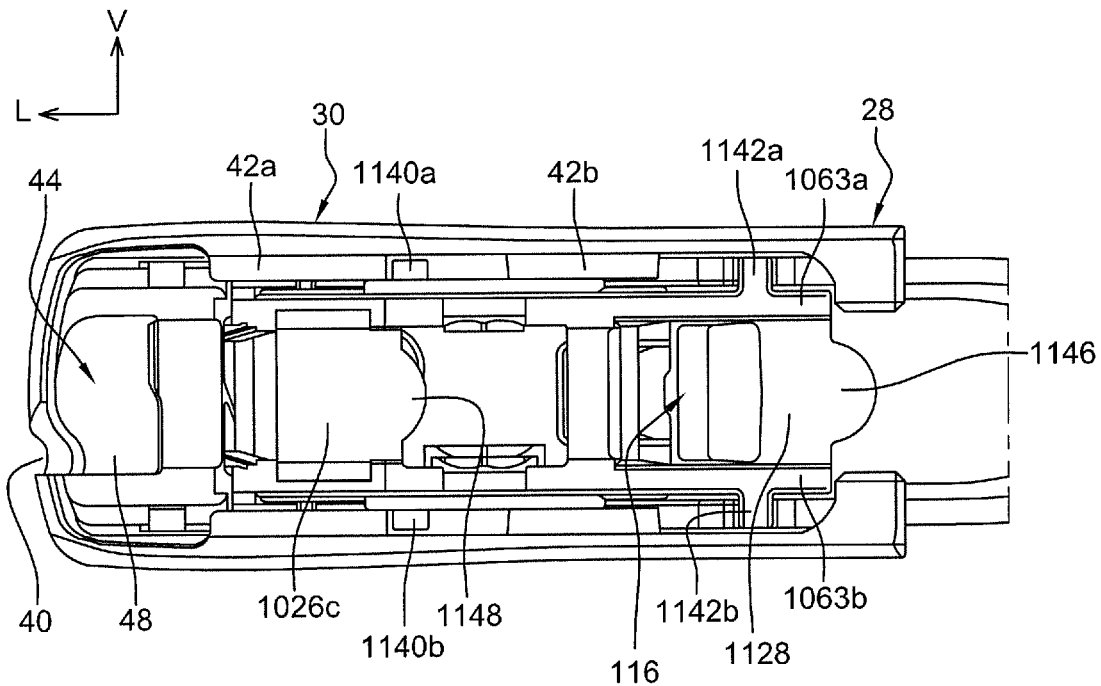
FIG. 19 is a view from beneath of the assembly illustrated in FIG. 15.

The longitudinal thickness of each stop 1029a, 1029b decreases vertically from the top down so as to exhibit a convex curved profile facing forwards (see FIG. 12).

Thus, the convex stop surface 1130a, 1130b has an upper transverse edge which is offset longitudinally forwards with respect to a lower transverse edge of the convex stop surface 1130a, 1130b.

The convex curved stops 1029a, 1029b allow the adapter to be positioned longitudinally on the yoke 28 or a component borne by the yoke 28, such as the end piece 44.

Figure 21:
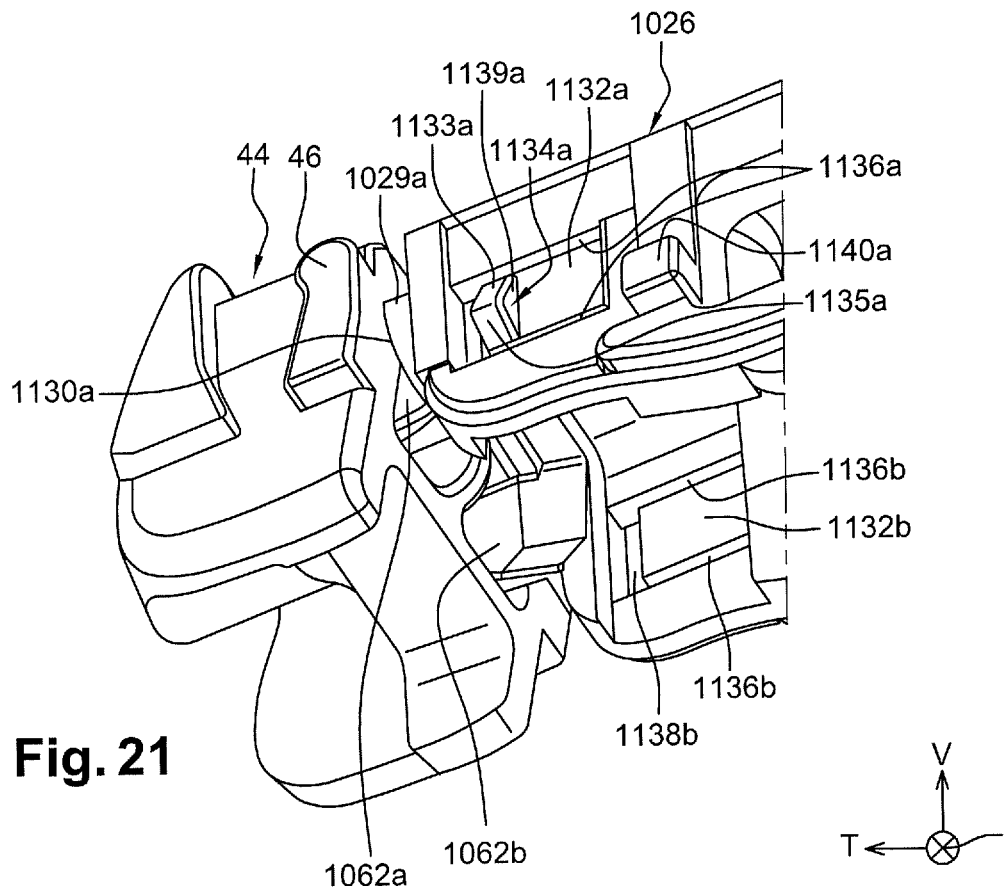
FIG. 21 is a large-scale perspective view illustrating in detail the collaboration between the curved stops of the adapter and the end piece.
Figure 22:
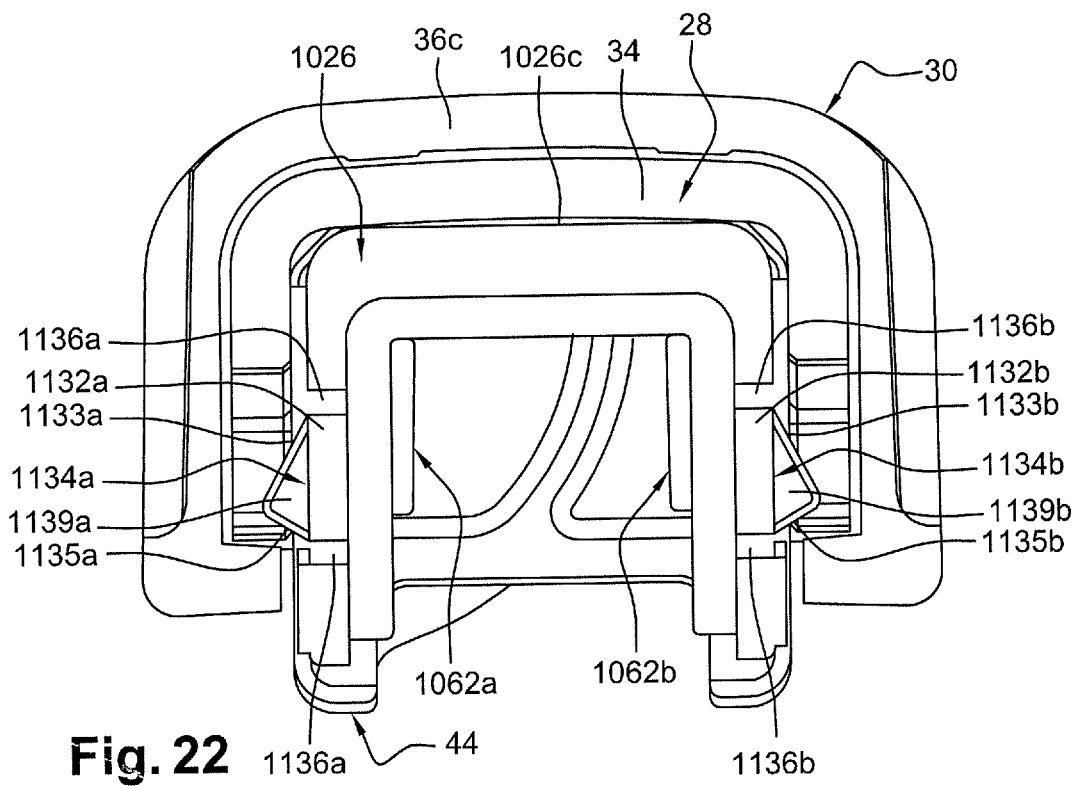
FIG. 22 is a view in section on a vertical transverse plane indicated by the line 22-22 in FIG. 15.

When assembling the adapter 1026 and the yoke 28 associated with the end piece 44, the convex stop surface 1130a, 1130b of the curved stops 1029a, 1029b comes to bear longitudinally against a portion of the yoke 28 or of the end piece 44 that faces it (see FIG. 21). The curved profile of the curved stops 1029a, 1029b thus acts as an assembly guide allowing the adapter 1026 to be prepositioned longitudinally in the yoke 28.

This prepositioning occurs gradually and the convex surfaces facilitate the relative pivoting movement of the adapter with respect to the yoke during assembly.

By way of nonlimiting example, each of the lateral walls 1026a, 1026b comprises a tab which is elastically deformable in the transverse direction, referred to as an elastic tab 1132a, 1132b.

The elastic tabs 1132a, 1132b are situated on a front part or portion of the lateral walls 1026a, 1026b. They extend over substantially 20% to 50% of the length of the lateral walls, or even preferably 25% to 35% of this length.

Each of the elastic tabs 1132a, 1132b has an overall longitudinal orientation parallel to the upper wall 1026c, which means to say a horizontal orientation.

Each elastic tab 1132a, 1132b is delimited by two horizontal parallel slots 1136a, 1136b and one front perpendicular vertical slot 1138a, 1138b that connects the two parallel slots 1136a, 1136b. The slots are formed in the corresponding lateral wall 1026a, 1026b and pass all the way through that wall.

In an alternative form which has not been depicted, it is also possible to conceive of the elastic tabs having a vertical overall orientation orthogonal to the upper wall 1026c.

The front free end of each of the elastic tabs 1132a, 1132b in this instance comprises a longitudinal retention lug or tooth 1134a, 1134b configured to collaborate with the yoke 28 and/or a component borne by the yoke 28 and/or the cap 30.

The retention lugs 1134a, 1134b project transversely outwards with respect to the plane of the associated elastic tab 1132a, 1132b.

The lugs have a triangular cam profile with an upper slope 1133a, 1133b, a lower slope 1135a, 1135b, a front face 1137a, 1137b and a rear face 1139a, 1139b.

The front face 1137a, 1137b of each of the retention lugs 1134a, 1134b comes to bear longitudinally on the yoke 28. The retention lugs 1134a, 1134b thus allow the adapter 1026 to be secured in the forward longitudinal direction with respect to the yoke 28.

The length of the upper slope 1133a, 1133b is greater than the length of the lower slope 1135a, 1135b.

The upper slope 1133a, 1133b of the retention lugs 1134a, 1134b allows each of the elastic tabs 1132a, 1132b to be retracted to pass over the longitudinal flange 42a situated at the front of the cap 30 when the adapter 1026 is being assembled in the yoke 28.

The lower slope 1135a, 1135b of the retention lugs 1134a, 1134b allows each of the elastic tabs 1132a, 1132b to retract to pass over the longitudinal flange 42a situated at the front of the cap 30 when the adapter 1026 is being dismantled.

Because of their elasticity and because of the triangular profile of their retention lugs 1134a, 1134b, the elastic tabs 1132a, 1132b do not contribute to the vertical retention of the adapter 1026 with respect to the yoke and/or the cap 30. By contrast, the elastic tabs 1132a, 1132b do contribute to the final longitudinal positioning of the adapter 1026.

In another alternative form which has not been depicted, the profile of the lugs 1134a, 1134b may be that of a trapezoid having an upper slope and a lower slope. The operation of the elastic tabs is then substantially similar.

The lateral walls 1026a, 1026b comprise projecting studs 1140a, 1140b, 1142a, 1142b configured to collaborate with the yoke 28 and/or the cap 30. The studs 1140a, 1140b, 1142a, 1142b project transversely outwards and each have a cubic overall shape.

In the second embodiment, each of the lateral walls 1026a, 1026b comprises, by way of nonlimiting example, two front studs 1140a, 1140b and two rear studs 1142a, 1142b.

The front studs 1140a, 1140b are situated on a front part of the lateral walls 1026a, 1026b. They are configured to collaborate with the cap 30 and come to bear against the front end of the notch 42a of the cap 30.

The front studs 1140a, 1140b guarantee that the cap 30 is in the closed position slid rearwards with respect to the yoke 28 during mounting of the adapter 1026.

This is because when the cap 30 is in the slid-forward open position, the flanges 42b of the cap 30 lie underneath the locations intended to accept the front studs 1140a, 1140b, preventing the adapter 1026 from being mounted and assembled in the yoke 28.

The rear studs 1142a, 1142b are situated on a rear part of the lateral walls 1026a, 1026b. In the embodiment depicted, the rear studs 1142a, 1142b project transversely from the retention tabs 1063a, 1063b.

The rear studs 1142a, 1142b are configured to collaborate with the yoke 28, notably with the rear notches 33d. They butt against the front edge of the associated rear notch 33d in such a way as to provide longitudinal retention of the adapter 1026 in the rearward direction with respect to the yoke 28.

Thus, the retention lugs 1134a, 1134b of the elastic tabs 1132a, 1132b and the front studs 1140a, 1140b provide twofold "securing" of the adapter 1026 longitudinally forwards with respect to the yoke, notably under significant load.

The rear studs 1142a, 1142b also press slightly upwards against the horizontal upper edge of the rear notches 33d.

The bottom of the lateral walls 1026a, 1026b comprises a bottom part 1143a, 1143b having a convex rounded contour in the shape of an arc of a circle.

In the second embodiment, this rounded bottom part 1143a, 1143b is formed with additional lateral thickness on the outside, thus increasing the rigidity of the lower part of the lateral walls 1026a, 1026b.

This additional thickness gives the adapter 1026 better ability to withstand the torsion and deformation it may experience under heavy load that may arise in the use of the windscreen wiper on a glazed surface covered with ice or with a layer of snow.

Specifically, once the adapter 1026 is mounted on the wiper 12, the lower part of the adapter 1026 is exposed to the open air and may experience attack from the external surroundings, particularly in the event of harsh weather conditions such as snow or ice.

The bottom part 1143a, 1143b of the adapter 1026 additionally comprises a protrusion 1144a, 1144b of rounded shape.

Figure 20:
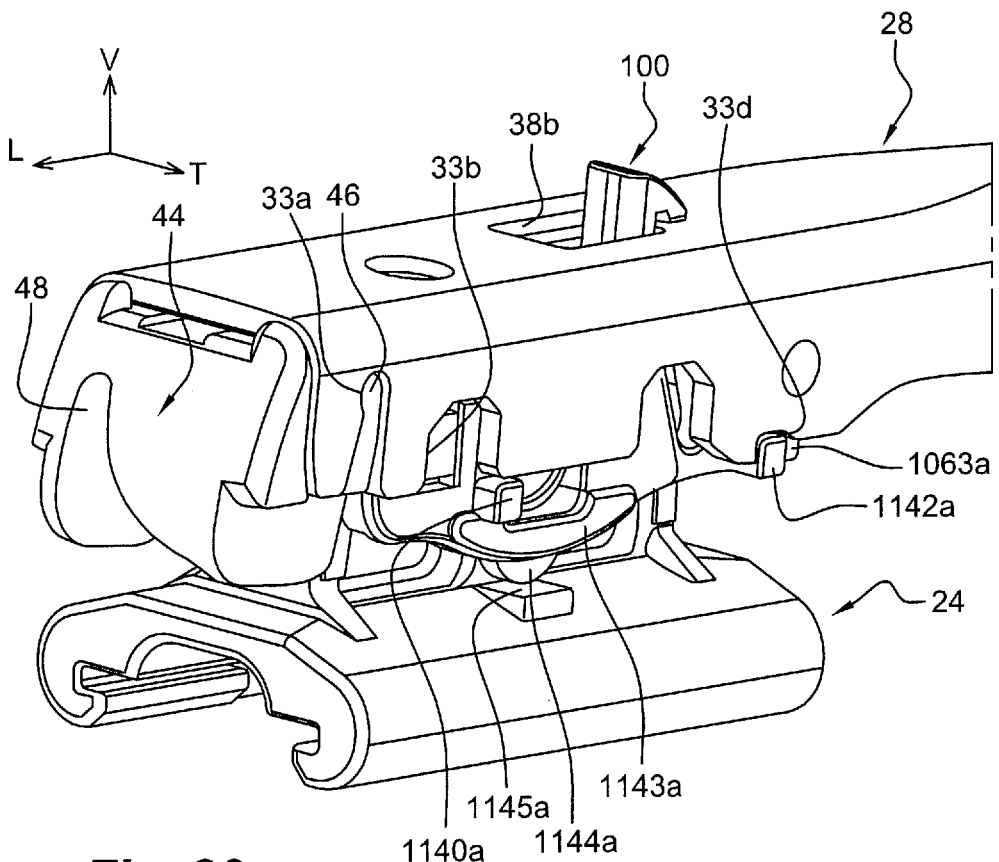
FIG. 20 is a perspective view of the assembly illustrated in FIGS. 16 and 18 and in which the connector is depicted in the position in which it is mounted in the adapter.

As can be seen in FIG. 20, the rounded protrusion 1144a, (1144b) bears in a pivoting manner against an opposing upper lateral facet 1145a, (1145b) of the connector 24 so as to provide vertical retention of the adapter 1026 in the downwards direction with respect to the connector 24.

The adapter 1026 here comprises at least one pickup zone 1146 and 1148 for the positioning of suction cups so that a machine can pick up the adapter 1026 while it is being mounted at the factory on a wiper 12.

For example, the rear cross member 1128 has a horizontal rear extension 1146 corresponding to a first pickup zone. The rear extension 1146 comprises a rounded rear edge that extends the rear cross member 1128 and makes it easier to position a pickup-suction cup (not depicted).

The horizontal upper wall 1026c also has a horizontal upper extension 1148 with rounded rear edge corresponding to a second pickup zone.

In an alternative form of embodiment which has not been depicted, the upper wall of the body of the adapter may comprise an elastically deformable tongue configured to bear against the internal face of the upper wall of the yoke, in order to eliminate any clearance there might be between the adapter and this internal face.

Such a clearance compensating tongue is situated for example in the vicinity of a front longitudinal end of the body, and the locking tab 100 is situated at an opposite rear longitudinal end of the body.

The mounting and assembling of the adapter 1026 in the yoke 28 are similar to those described with reference to the first embodiment.

The adapter 1026 is mounted, and can be mounted, only when the cap 30 is in the slid-rearward closed position.

First of all, the retention tabs 1062a, 1062b are engaged in the complementary recesses in the end piece 44 mounted at the front free end of the yoke 28 of the arm. Their engagement is facilitated by the presence of the chamfer 1126a, 1126b.

The adapter 1026 is then brought into the position illustrated in FIG. 4 by pivoting the adapter 1026 upwards.

The pivoting of the adapter 1026 is made easier by the curved stops 1029a, 1029b which bear longitudinally against the end piece 44.

During the pivoting or tilting, the retention lugs 1134a, 1134b of the elastic tabs 1132a, 1132b retract thanks to the upper slope 1133a, 1133b so that they can pass over the longitudinal flange 42a situated at the front of the cap 30.

The front face 1137a, 1137b of the retention lugs 1134a, 1134b comes to bear against the yoke 28, providing longitudinal retention of the adapter 1026 in the forwards direction.

Next, the front studs 1140a, 1140b pass over the flanges 42a of the cap 30, guaranteeing that the latter is indeed in the closed position.

Finally, the rear studs 1142a, 1142b become inserted in the rear notches 33d and come into abutment against the front edge of the rear notches 33d so as to provide longitudinal retention of the adapter 1026 in the rearward direction.

The adapter is then in the position illustrated notably in FIGS. 16 to 22.

In this position, a portion of the convex profiled surface 112 comes into contact with the rear transverse edge 39b of the rear opening 38b of the yoke 28.

The locking tab 100 is then locked in the rear opening 38b of the yoke 28 as in the first embodiment.

In order to dismantle the adapter 1026 of the second embodiment from the wiper 12, the procedure is similar to the way in which the adapter 26 of the first embodiment is dismantled.

Once the locking tab 100 has been unlocked and extracted from the rear opening 38b by pivoting the adapter 1026 downwards, the retention lugs 1134a, 1134b of the elastic tabs 1132a, 1132b retract thanks to the lower slope 1135a, 1135b so that they can pass over the longitudinal flange 42a situated at the front of the cap 30.

The adapter 1026 can finally be completely dismantled by disengaging the retention tabs 1062a, 1062b from the complementary recesses in the end piece 44 of the yoke 28 of the arm.

The invention claimed is:

1. An adapter for a wiper of a motor vehicle, comprising:
   a body of longitudinally elongate shape which is delimited by two vertical longitudinal lateral walls which are transversely opposite and joined together by a horizontal upper wall, the body being shaped to be mounted in a complementary yoke of inverted U-shaped cross section belonging to a wiper arm,
   wherein the body of the adapter comprises at least one elastic tab which is deformable in a transverse direction so as to retract as the adapter is being assembled and/or dismantled with respect to the yoke, the at least one elastic tab is delimited by at least one slot formed in the two vertical longitudinal lateral walls of the body of the adapter,
   wherein the body of the adapter comprises at least two longitudinally arranged retention tabs, each of which extends longitudinally forwards from a front longitudinal end in continuation of an associated lateral wall of the two vertical longitudinal lateral walls of the body of the adapter,
   wherein the at least two retention tabs retain the adapter in a rearwards longitudinal direction, and
   wherein the at least two retention tabs each comprise a chamfer, formed on a lower edge of the respective retention tab, which engages in complimentary recesses of an end piece of the yoke.

2. The adapter according to claim 1, wherein the at least one elastic tab bears a longitudinal retention lug configured to collaborate with the yoke and/or a component borne by the yoke.

3. The adapter according to claim 2, wherein the retention lug has a retractable cam profile able to collaborate with the yoke or a component borne by the yoke, the cam profile being a profile having two opposite slopes for mounting and dismantling respectively.

4. The adapter according to claim 2, wherein the at least one elastic tab extends longitudinally, and the retention lug is formed at a front free end of the elastic tab.

5. The adapter according to claim 1, further comprising at least one front stud which extends transversely projecting outwards and which is arranged on a front part of a lateral wall of the body, the at least one front stud being configured to collaborate with a component borne by the yoke or with the yoke so as to guarantee that this component is in a determined longitudinal position with respect to the yoke.

6. The adapter according to claim 1, further comprising at least one rear stud which extends transversely projecting outwards and which is arranged on a rear part of a lateral wall of the body, the at least one rear stud being configured to collaborate with the yoke to provide longitudinal retention of the adapter in the forward direction with respect to the yoke.

7. The adapter according to claim 1, wherein, at the front longitudinal end, the body of the adapter comprises at least one convex curved stop surface for longitudinally positioning the adapter with respect to the yoke or a component borne by the yoke.

8. The adapter according to claim 7, wherein the at least one convex curved stop surface has an upper transverse edge which is longitudinally offset forwards with respect to a lower transverse edge of the at least one convex curved stop surface.

9. The adapter according to claim 7, wherein the at least one convex curved stop surface is able to come to bear longitudinally against an opposing portion of the yoke or of a component borne by the yoke so as to guide assembly of the adapter in the yoke or in the component borne by the yoke.

10. The adapter according to claim 7, wherein the at least one convex curved stop surface is formed at the front longitudinal end of an associated longitudinal lateral wall of the body of the adapter.

11. The adapter according to claim 1, further comprising at least one tab for longitudinal retention of the body of the adapter with respect to the yoke or a component borne by the yoke, which extends longitudinally rearwards and is shaped to collaborate with the yoke or a component borne by the yoke.

12. The adapter according to claim 1, wherein the body of the adapter comprises a locking tab which:

extends vertically projecting above an upper face of the body, is configured to be received through a hole in the yoke, bears a rear contact surface for contact with an edge of the hole in the yoke; and is connected to the body of the adapter by a vertical connecting part which is able to deform elastically so as to allow a longitudinal movement of the rear contact surface.

13. An assembly comprising:

a wiper arm; and an adapter according to claim 1, wherein the yoke is equipped with a front cap which covers the yoke and is opened vertically downwards, the cap being mounted with the ability to slide longitudinally on the yoke.

14. A motor vehicle wiper comprising:

a wiper blade to wipe a window of the vehicle; and a connection assembly to connect the wiper blade to a drive arm, the connection assembly comprising at least one adapter according to claim 1.

* * * * *